(12) United States Patent
Reed et al.

(10) Patent No.: US 11,669,361 B1
(45) Date of Patent: Jun. 6, 2023

(54) SYSTEM, METHOD AND PROGRAM PRODUCT FOR OPTIMIZING COMPUTER PROCESSING POWER IN CLOUD COMPUTING SYSTEMS

(71) Applicant: Ai-Blockchain, Inc., Bergenfield, NJ (US)

(72) Inventors: Stephen Lester Reed, Austin, TX (US); Sanjiv Chandroo Hingorani, Bergenfield, NJ (US)

(73) Assignee: Ai-Blockchain, Inc., Bergenfield, NJ (US)

(*) Notice: Subject to any disclaimer, the term of this patent is extended or adjusted under 35 U.S.C. 154(b) by 101 days.

(21) Appl. No.: 17/220,001

(22) Filed: Apr. 1, 2021

(51) Int. Cl.
| | |
|---|---|
| H04L 15/16 | (2006.01) |
| G06F 9/455 | (2018.01) |
| G06F 9/50 | (2006.01) |
| G06F 9/44 | (2018.01) |
| H04L 29/08 | (2006.01) |
| H04L 29/12 | (2006.01) |
| H04L 12/46 | (2006.01) |
| H04L 41/0894 | (2022.01) |

(52) U.S. Cl.
CPC ...... *G06F 9/45558* (2013.01); *H04L 41/0894* (2022.05); *G06F 2009/45575* (2013.01); *G06F 2009/45595* (2013.01)

(58) Field of Classification Search
CPC ....... G06F 9/45558; G06F 2009/45575; G06F 2009/45595; H04L 41/0894
USPC ......................................................... 709/225
See application file for complete search history.

(56) References Cited

U.S. PATENT DOCUMENTS

| | | | | |
|---|---|---|---|---|
| 5,956,745 A | * | 9/1999 | Bradford | G06F 3/0605 |
| | | | | 360/48 |
| 7,809,916 B1 | * | 10/2010 | Shavit | G06F 9/526 |
| | | | | 711/170 |

(Continued)

FOREIGN PATENT DOCUMENTS

| | | | | | |
|---|---|---|---|---|---|
| CA | 2824327 C | * | 3/2020 | | G06F 3/01 |
| WO | WO-2019002559 A1 | * | 1/2019 | | G06F 3/04815 |
| WO | WO-2022132433 A1 | * | 6/2022 | | G06F 1/30 |

OTHER PUBLICATIONS

Amazon EC2 Instance Types—Amazon Web Services, https://aws.amazon.com/ec2/instance-types/, accessed Jun. 29, 2021 (internet).

(Continued)

*Primary Examiner* — Zi Ye
*Assistant Examiner* — Berhanu Shitayewoldetadik
(74) *Attorney, Agent, or Firm* — Amster, Rothstein & Ebenstein LLP

(57) ABSTRACT

Systems and methods are provided for optimizing computer processing power in cloud computing systems. The method may include obtaining, by an interactive dynamic resizer application stored on non-volatile computer readable memory operatively connected to an administrator device, status information of a first server instance; accessing policy rule information for a first set of server instances associated with a first server; identifying a second server instance based on the status information and the policy rules information; automatically selecting the second server instance; generating resizing instructions based on the selected second server instance; and sending the resizing instructions to a cloud network.

18 Claims, 22 Drawing Sheets

(56) References Cited

U.S. PATENT DOCUMENTS

| | | | | |
|---|---|---|---|---|
| 8,108,640 | B1* | 1/2012 | Holl, II | H04L 67/1097 |
| | | | | 711/171 |
| 9,691,131 | B1* | 6/2017 | Weisberger | G09G 5/391 |
| 10,678,995 | B2* | 6/2020 | Sisson | G06F 40/166 |
| 11,038,986 | B1* | 6/2021 | Acar | H04L 67/10 |
| 11,178,218 | B2* | 11/2021 | Avila | H04L 67/1029 |
| 2002/0000998 | A1* | 1/2002 | Scott | H04N 19/63 |
| | | | | 375/E7.04 |
| 2002/0063724 | A1* | 5/2002 | Powers | H04N 1/00127 |
| | | | | 345/629 |
| 2004/0073873 | A1* | 4/2004 | Croney | G06T 3/4092 |
| | | | | 715/275 |
| 2006/0288306 | A1* | 12/2006 | Mahajan | G06F 9/452 |
| | | | | 709/224 |
| 2007/0180449 | A1* | 8/2007 | Croft | H04L 67/141 |
| | | | | 718/1 |
| 2009/0276771 | A1* | 11/2009 | Nickolov | H04L 67/1008 |
| | | | | 718/1 |
| 2012/0041822 | A1* | 2/2012 | Landry | G06Q 30/0261 |
| | | | | 705/14.66 |
| 2012/0047239 | A1* | 2/2012 | Donahue | G06F 9/5072 |
| | | | | 709/220 |
| 2012/0050334 | A1* | 3/2012 | Velthoven | G06T 7/44 |
| | | | | 345/660 |
| 2012/0158945 | A1* | 6/2012 | Goldbach | G06F 9/5033 |
| | | | | 709/224 |
| 2012/0198345 | A1* | 8/2012 | von Eicken | H04L 67/00 |
| | | | | 715/735 |
| 2012/0266189 | A1* | 10/2012 | Zaslavsky | G06Q 30/02 |
| | | | | 725/32 |
| 2013/0124712 | A1* | 5/2013 | Parker | H04L 43/55 |
| | | | | 709/224 |
| 2014/0082612 | A1* | 3/2014 | Breitgand | G06F 9/45533 |
| | | | | 718/1 |
| 2014/0101200 | A1* | 4/2014 | Haber | G06F 16/2455 |
| | | | | 707/774 |
| 2015/0058844 | A1* | 2/2015 | Conklin | G06F 9/5083 |
| | | | | 718/1 |
| 2015/0234834 | A1* | 8/2015 | Haber | G06F 16/2455 |
| | | | | 707/774 |
| 2015/0277956 | A1* | 10/2015 | Uchikawa | G06F 9/45558 |
| | | | | 718/1 |
| 2015/0281401 | A1* | 10/2015 | Le | G06F 40/20 |
| | | | | 709/203 |
| 2015/0365349 | A1* | 12/2015 | Verma | H04L 47/70 |
| | | | | 709/226 |
| 2016/0041787 | A1* | 2/2016 | Nicolae | G06F 3/0685 |
| | | | | 710/74 |
| 2016/0134558 | A1* | 5/2016 | Steinder | H04L 67/51 |
| | | | | 709/226 |
| 2016/0373289 | A1* | 12/2016 | Hernandez | H04L 41/16 |
| 2017/0308275 | A1* | 10/2017 | Sowden | G06F 3/04817 |
| 2017/0309255 | A1* | 10/2017 | Deguzman | G06F 9/451 |
| 2018/0012378 | A1* | 1/2018 | Khandpur | G06T 7/33 |
| 2018/0046602 | A1* | 2/2018 | Sisson | G06F 16/972 |
| 2018/0053281 | A1* | 2/2018 | Parag | G06F 3/0488 |
| 2018/0239751 | A1* | 8/2018 | Durr | G06N 20/00 |
| 2018/0331918 | A1* | 11/2018 | Woodmansee | H04L 41/40 |
| 2019/0204993 | A1* | 7/2019 | Bastide | G06F 3/0481 |
| 2019/0325292 | A1* | 10/2019 | Remis | G06F 16/9024 |
| 2020/0117589 | A1* | 4/2020 | Davis | G06F 9/5016 |
| 2020/0250548 | A1* | 8/2020 | Shwartz | G06N 20/00 |
| 2021/0061471 | A1* | 3/2021 | Bates | G06Q 30/0255 |
| 2021/0297504 | A1* | 9/2021 | Acar | G06F 9/5072 |
| 2021/0409347 | A1* | 12/2021 | Krebs | H04L 47/781 |
| 2022/0179859 | A1* | 6/2022 | Faltin | G06F 16/248 |
| 2022/0247741 | A1* | 8/2022 | Moreton | H04L 9/3226 |

OTHER PUBLICATIONS

Amazon Elastic Compute Cloud—Wikipedia, https://en.wikipedia.org/wiki/Amazon_Elastic_Compute_Cloud, accessed Jun. 29, 2021 (internet).

Amazon Web Services—Auto Scaling—Tutorialspoint, https://www.tutorialspoint.com/amazon_web_services/amazon_web_services_auto_scaling.htm, accessed Jun. 29, 2021 (internet).

Amazon ArchitectureAmazon Web Services—Basic Architecture, https://www.tutorialspoint.com/amazon_web_services/amazon_web_services_basic_architecture.htm, accessed Jun. 29, 2021 (internet).

Amazon ComputingAmazon Web Services—Cloud Computing, https://www.tutorialspoint.com/amazon_web_services/amazon_web_services_cloud_computing.htm, accessed Jun. 29, 2021 (internet).

AWS CloudAWS—Elastic Compute Cloud—Tutorialspoint, https://www.tutorialspoint.com/amazon_web_services/amazon_web_services_elastic_compute_cloud.htm, accessed Jun. 29, 2021 (internet).

AWS—Management Console—Tutorialspoint, https://www.tutorialspoint.com/amazon_web_services/amazon_web_services_management_console.htm, accessed Jun. 29, 2021 (internet).

Change the instance type—Amazon Elastic Compute Cloud, https://docs.aws.amazon.com/AWSEC2/latest/UserGuide/ec2-instance-resize.html, accessed Jun. 29, 2021 (internet).

Compute optimized instances—Amazon Elastic Compute Cloud, https://docs.aws.amazon.com/AWSEC2/latest/UserGuide/compute-optimized-instances.html, accessed Jun. 29, 2021 (internet).

Instance types—Amazon Elastic Compute Cloud, https://docs.aws.amazon.com/AWSEC2/latest/UserGuide/instance-types.html, accessed Jun. 29, 2021 (internet).

Storage—Amazon Elastic Compute Cloud, https://docs.aws.amazon.com/AWSEC2/latest/UserGuide/Storage.html, accessed Jun. 29, 2021 (internet).

U.S. Appl. No. 15/045,148, filed Feb. 16, 2016, Issued as U.S. Pat. No. 10,579,974.

U.S. Appl. No. 16/748,158, filed Jan. 21, 2020, Pending.

* cited by examiner

| Model | vCPU | Memory (GiB) | Instance Storage (GiB) | Network Bandwidth (Gbps) | EBS Bandwidth (Mbps) |
|---|---|---|---|---|---|
| c5.large | 2 | 4 | EBS-Only | Up to 10 | Up to 4,750 |
| c5.xlarge | 4 | 8 | EBS-Only | Up to 10 | Up to 4,750 |
| c5.2xlarge | 8 | 16 | EBS-Only | Up to 10 | Up to 4,750 |
| c5.4xlarge | 16 | 32 | EBS-Only | Up to 10 | 4,750 |
| c5.9xlarge | 36 | 72 | EBS-Only | 10 | 9,500 |
| c5.12xlarge | 48 | 96 | EBS-Only | 12 | 9,500 |
| c5.18xlarge | 72 | 144 | EBS-Only | 25 | 19,000 |
| c5.24xlarge | 96 | 192 | EBS-Only | 25 | 19,000 |
| c5.metal | 96 | 192 | EBS-Only | 25 | 19,000 |
| c5d.large | 2 | 4 | 1 x 50 NVMe SSD | Up to 10 | Up to 4,750 |
| c5d.xlarge | 4 | 8 | 1 x 100 NVMe SSD | Up to 10 | Up to 4,750 |
| c5d.2xlarge | 8 | 16 | 1 x 200 NVMe SSD | Up to 10 | Up to 4,750 |
| c5d.4xlarge | 16 | 32 | 1 x 400 NVMe SSD | Up to 10 | 4,750 |
| c5d.9xlarge | 36 | 72 | 1 x 900 NVMe SSD | 10 | 9,500 |
| c5d.12xlarge | 48 | 96 | 2 x 900 NVMe SSD | 12 | 9,500 |
| c5d.18xlarge | 72 | 144 | 2 x 900 NVMe SSD | 25 | 19,000 |
| c5d.24xlarge | 96 | 192 | 4 x 900 NVMe SSD | 25 | 19,000 |
| c5d.metal | 96 | 192 | 4 x 900 NVMe SSD | 25 | 19,000 |

| Model | vCPU | Memory (GiB) | Instance Storage (GB) | Network Bandwidth (Gbps) | EBS Bandwidth (Mbps) |
|---|---|---|---|---|---|
| c5n.large | 2 | 5.25 | EBS-Only | Up to 25 | Up to 4,750 |
| c5n.xlarge | 4 | 10.5 | EBS-Only | Up to 25 | Up to 4,750 |
| c5n.2xlarge | 8 | 21 | EBS-Only | Up to 25 | Up to 4,750 |
| c5n.4xlarge | 16 | 42 | EBS-Only | Up to 25 | 4,750 |
| c5n.9xlarge | 36 | 96 | EBS-Only | 50 | 9,500 |
| c5n.18xlarge | 72 | 192 | EBS-Only | 100 | 19,000 |
| c5n.metal | 72 | 192 | EBS-Only | 100 | 19,000 |

| Model | vCPU | Memory (GiB) | Instance Storage (GiB) | Network Bandwidth (Gbps) | EBS Bandwidth (Mbps) |
|---|---|---|---|---|---|
| c5a.large | 2 | 4 | EBS-Only | Up to 10 | Up to 3,170 |
| c5a.xlarge | 4 | 8 | EBS-Only | Up to 10 | Up to 3,170 |
| c5a.2xlarge | 8 | 16 | EBS-Only | Up to 10 | Up to 3,170 |
| c5a.4xlarge | 16 | 32 | EBS-Only | Up to 10 | Up to 3,170 |
| c5a.8xlarge | 32 | 64 | EBS-Only | 10 | 3,170 |
| c5a.12xlarge | 48 | 96 | EBS-Only | 12 | 4,750 |
| c5a.16xlarge | 64 | 128 | EBS-Only | 20 | 6,300 |
| c5a.24xlarge | 96 | 192 | EBS-Only | 20 | 9,500 |
| c5ad.large | 2 | 4 | 1 x 75 NVMe SSD | Up to 10 | Up to 3,170 |
| c5ad.xlarge | 4 | 8 | 1 x 150 NVMe SSD | Up to 10 | Up to 3,170 |
| c5ad.2xlarge | 8 | 16 | 1 x 300 NVMe SSD | Up to 10 | Up to 3,170 |
| c5ad.4xlarge | 16 | 32 | 2 x 300 NVMe SSD | Up to 10 | Up to 3,170 |
| c5ad.8xlarge | 32 | 64 | 2 x 600 NVMe SSD | 10 | 3,170 |
| c5ad.12xlarge | 48 | 96 | 2 x 900 NVMe SSD | 12 | 4,750 |
| c5ad.16xlarge | 64 | 128 | 2 x 1200 NVMe SSD | 20 | 6,300 |
| c5ad.24xlarge | 96 | 192 | 2 x 1900 NVMe SSD | 20 | 9,500 |

SYSTEM, METHOD AND PROGRAM PRODUCT FOR OPTIMIZING COMPUTER PROCESSING POWER IN CLOUD COMPUTING SYSTEMS

FIELD OF THE INVENTION

The present invention generally relates to systems and methods for optimizing computer processing power in cloud computing systems. In embodiments, the systems and methods for optimizing computer processing power in cloud computing systems may be used to automatically select server instances on a cloud network.

BACKGROUND

The demand for secure, resizable web-scale cloud computing capacity has increased significantly in recent years. Cloud computing is an internet-based computing service in which large groups of remote servers are networked to allow centralized data storage and online access to computer services or resources. Web developers often rent virtual computers set up as servers from cloud computing services in order to run and operate their own computer applications. These cloud computing services include Amazon EC2, Google Compute Engine, IBM Cloud Virtual Servers, and Azure Virtual Machines, to name a few. For example, Amazon EC2, a web service interface within the Amazon Web Services cloud, provides resizable, secure compute capacity in the cloud via a "virtual machine" (also known as an "instance"). An Amazon EC2 customer can create, launch, and terminate server instances as needed, and customers pay by the hour for active servers. Server instances can be resized and the number of instances may be scaled up or down as per the customer's requirements. Amazon EC2 gives customers control over the geographical location of instances which allows for latency optimization and high levels of redundancy.

Amazon EC2 customers may select from a variety of instance family types, including C5, C5d, and C5n server instance families. Each family of servers offer a variety of server instances having varied virtual computer processing power capacity, memory, and network bandwidth. For example, the "C5d large" instance type of the C5d server instance family offers 2 virtual central processing units (CPUs), 4 gibibytes (GiB) memory, and up to 10 gigabits per second (Gbps) of network bandwidth, and the "C5d xlarge" offers 4 vCPU, 8 GiB memory, and up to 10 Gbps of network bandwidth. The cost of operating each instance type varies by the size of the current instance type in use. For example, it may cost $0.096 per hour to operate the C5d large instance type, and it may cost $0.192 per hour to operate the C5d xlarge instance type. Customers may manually resize the instance type that is currently in use by selecting, via a server management web interface, an instance type identified by instance ID, stopping the current instance in use, and configuring and booting the selected instance type. A server instance resizing is known as a resizing event. During a resizing event it may take up to 90 seconds to stop the current instance, and over 3 minutes to configure and boot the new instance.

A customer may desire to execute a resizing event because at one time of the day or week, the customer may require more computing capacity, and therefore will need a larger and more expensive server or instance type. At other times of the day or week, the customer may require less computing capacity, and will therefore want to decrease the size of the server or instance type in use in order to save money on operating costs. Making the decision to increase or decrease computing capacity at different times of the day and/or week is difficult and burdensome, and a solution is needed to automatically analyze computing capacity usage and automatically resize servers accordingly.

SUMMARY

A method of automatically selecting a server instance on a cloud network from a first set of server instances associated with a first server, wherein the first set of server instances may include at least a first server instance and a second server instance, may include: a) obtaining, by an interactive dynamic resizer application stored on non-volatile computer readable memory operatively connected to an administrator device, status information of the first server instance, wherein the status information may include current virtual computing power capacity usage percentage and current usage time information; b) accessing, by the interactive dynamic resizer application, policy rule information for the first set of server instances associated with the first server, wherein policy rule information may include: i. a prior usage time threshold associated with a length of time during which a respective server instance of the first set of server instances has been running; ii. a virtual computing power capacity percentage threshold associated with a percentage of computing power capacity of the respective server instance; and iii. resizing event type information indicating a selection of a second server instance based at least on the prior usage of time threshold and the virtual computing power capacity percentage threshold; c) identifying, by the interactive dynamic resizer application, the second server instance based on the status information and the policy rules information; d) automatically selecting, by the interactive dynamic resizer application, the second server instance; e) generating, by the interactive dynamic resizer application, resizing instructions based on the selected second server instance, wherein the resizing instructions comprise instructions to stop the first server instance and instructions to start the second server instance; and f) sending, by the interactive dynamic resizer application, the resizing instructions to the cloud network.

In embodiments, the current time usage information may be associated with a length of time during which the first server instance has been running.

In embodiments, the method may further include providing a policy rules engine wherein the policy rule information for each server is provided to the policy rules engine and is accessed via the policy rules engine.

In embodiments, the policy rule information may further include a minimum timeframe between resizing events of the respective server.

In embodiments, the policy rule information may include a scheduled time for obtaining status information and accessing policy rule information.

In embodiments, when the current usage time exceeds the prior usage time threshold and the current virtual computing power capacity percentage exceeds the threshold virtual computing power capacity percentage, the interactive dynamic resizer application may trigger a selection of the second server instance wherein the second server instance has a larger virtual computing power capacity than the first server instance.

In embodiments, when the current usage time exceeds the prior usage time threshold and the current virtual computing power capacity percentage exceeds the threshold virtual computing power capacity percentage, the interactive dynamic resizer application may trigger a selection of the second server instance wherein there is no other server instance in the first set of server instances that has a larger virtual computing power capacity than the first server instance and a smaller virtual computing power capacity than the second server instance.

In embodiments, when the current usage time exceeds the prior usage time threshold and the current virtual computing power capacity percentage exceeds the threshold virtual computing power capacity percentage, the interactive dynamic resizer application may trigger a selection of the second server instance wherein there is a third server instance in the first set of server instances which has a larger virtual computing power capacity than the first server instance but a smaller virtual computing power capacity than the second server instance.

In embodiments, when the current usage time exceeds the prior usage time threshold and the current virtual computing power capacity percentage is lower by more than a predetermined amount than the threshold virtual computing power capacity percentage, the interactive dynamic resizer application may trigger a selection of the second server instance wherein the second server instance has a smaller virtual computing power capacity than the first server instance.

In embodiments, when the current usage time exceeds the prior usage time threshold and the current virtual computing power capacity percentage is lower by more than a predetermined amount than the threshold virtual computing power capacity percentage, the interactive dynamic resizer application may trigger a selection of the second server instance wherein there is a third server instance in the first set of server instances which has a smaller virtual computing power capacity than the first server instance but a larger virtual computing power capacity than the second server instance.

In embodiments, when the current usage time exceeds the prior usage time threshold and the current virtual computing power capacity percentage is lower by more than a predetermined amount than the threshold virtual computing power capacity percentage, the interactive dynamic resizer application may trigger a selection of the second server instance wherein there is a fourth server instance in the first set of server instances which has a smaller virtual computing power capacity than the third server instance but a larger virtual computing power capacity than the second server instance.

In embodiments, when the current usage time exceeds the prior usage time threshold and the current virtual computing power capacity percentage is lower by more than a predetermined amount than the threshold virtual computing power capacity percentage, the interactive dynamic resizer application may trigger a selection of the second server instance wherein there is a fifth server instance in the first set of server instances which has a smaller virtual computing power capacity than the fourth server instance but a larger virtual computing power capacity than the second server instance.

In embodiments, when the current usage time exceeds the prior usage time threshold and the current virtual computing power capacity percentage is lower by more than a predetermined amount than the threshold virtual computing power capacity percentage, the interactive dynamic resizer application may trigger a selection of the second server instance wherein there is no other server instance in the first set of server instances that has a smaller virtual computing power capacity than the first server instance and a larger virtual computing power capacity than the second server instance.

In embodiments, when the current usage time exceeds the prior usage time threshold and the current virtual computing power capacity percentage is lower than the threshold virtual computing power capacity percentage, the interactive dynamic resizer application does not trigger a selection of the second server instance such that there is no change in server instance size.

In embodiments, when the current usage time does not exceed the prior usage time threshold and the current virtual computing power capacity percentage exceeds the threshold virtual computing power capacity percentage, the interactive dynamic resizer application may not trigger a selection of the second server instance such that there is no change in server instance size.

In embodiments, the method may further include sending, by the interactive dynamic resizer application instructions to the cloud network via an application program interface.

In embodiments, the method may further include providing, by the interactive dynamic resizer application, server instance information associated with each server instance associated with the first set of server instances, wherein the server instance information for each server instance may include at least: i. a maximum virtual computing power capacity; ii. a volume of memory; and iii. an amount of network bandwidth.

In embodiments, the method may further include verifying, by the interactive dynamic resizer application, that the second server instance is running properly.

In embodiments, the method may further include reporting, by the interactive dynamic resizer application, the result of the resizing event to a user of the interactive dynamic resizer application.

A method of automatically selecting a server instance on a cloud network from a first set of server instances associated with a first server, wherein the first set of server instances may include at least a first server instance and a second server instance, may include: a) obtaining, by an interactive dynamic resizer application stored on non-volatile computer readable memory operatively connected to an administrator device, status information associated with the first server instance of the first server, wherein the status information may include: i. a prior usage time threshold of the first server instance; ii. current virtual computing power capacity usage percentage of the first server instance; and iii. a time stamp corresponding to the current virtual computing power capacity usage percentage of the first server instance; b) automatically selecting, by the interactive dynamic resizer application, a second server instance using machine learning techniques performed by using a neural network: i. trained with a data set which may include a training set of historical status information of the first set of server instances of the first server, and associated time stamps tagged with respective resizing events; and ii. having an input comprising the status information of the first server instance; c) generating, by the interactive dynamic resizer application, resizing instructions based on the selected second server instance; and d) sending, by the interactive dynamic resizer application, the resizing instructions to the cloud network.

In embodiments, the training set may further include associated time stamps tagged with scheduled server backup events.

In embodiments, the training set may further include historic web page response time information associated with respective status information provided by each respective server instance of the first set of server instances.

In embodiments, the training set may further include an average query duration associated with respective status information for each respective server instance of the first set of server instances.

In embodiments, may further include providing, by the interactive dynamic resizer application, server instance information associated with each server instance associated with the first set of server instances, wherein the server instance information for each server instance may include at least: i. a maximum virtual computing power capacity; ii. a volume of memory; and iii. an amount network bandwidth.

In embodiments, the method may further include verifying, by the interactive dynamic resizer application, that the second server instance is running properly.

In embodiments, the method may further include reporting, by the interactive dynamic resizer application, the result of the resizing event to a user of the interactive dynamic resizer application.

In embodiments, the method may further include determining, by the interactive dynamic resizer application, no selection of the second server instance based on the output of the neural network, such that there is no change in status of the first server instance.

BRIEF DESCRIPTION OF THE DRAWINGS

The above and related objects, features, and advantages of the present disclosure will be more fully understood by reference to the following detailed description of the preferred, albeit illustrative, embodiments of the present invention when taken in conjunction with the accompanying figures, wherein:

FIGS. 7-9 illustrate example server instance types and corresponding computer processer capacity and memory in accordance with embodiments of the present invention.

FIG. 15 is a schematic illustration of a typical server management interface.

DETAILED DESCRIPTION OF THE EXEMPLARY EMBODIMENTS

The present invention generally relates to systems and methods for optimizing computer processing power in cloud computing systems. In embodiments, the method and system for optimizing computer processing power in cloud computing systems may be used to automatically select server instances on a cloud network.

Figure 1:
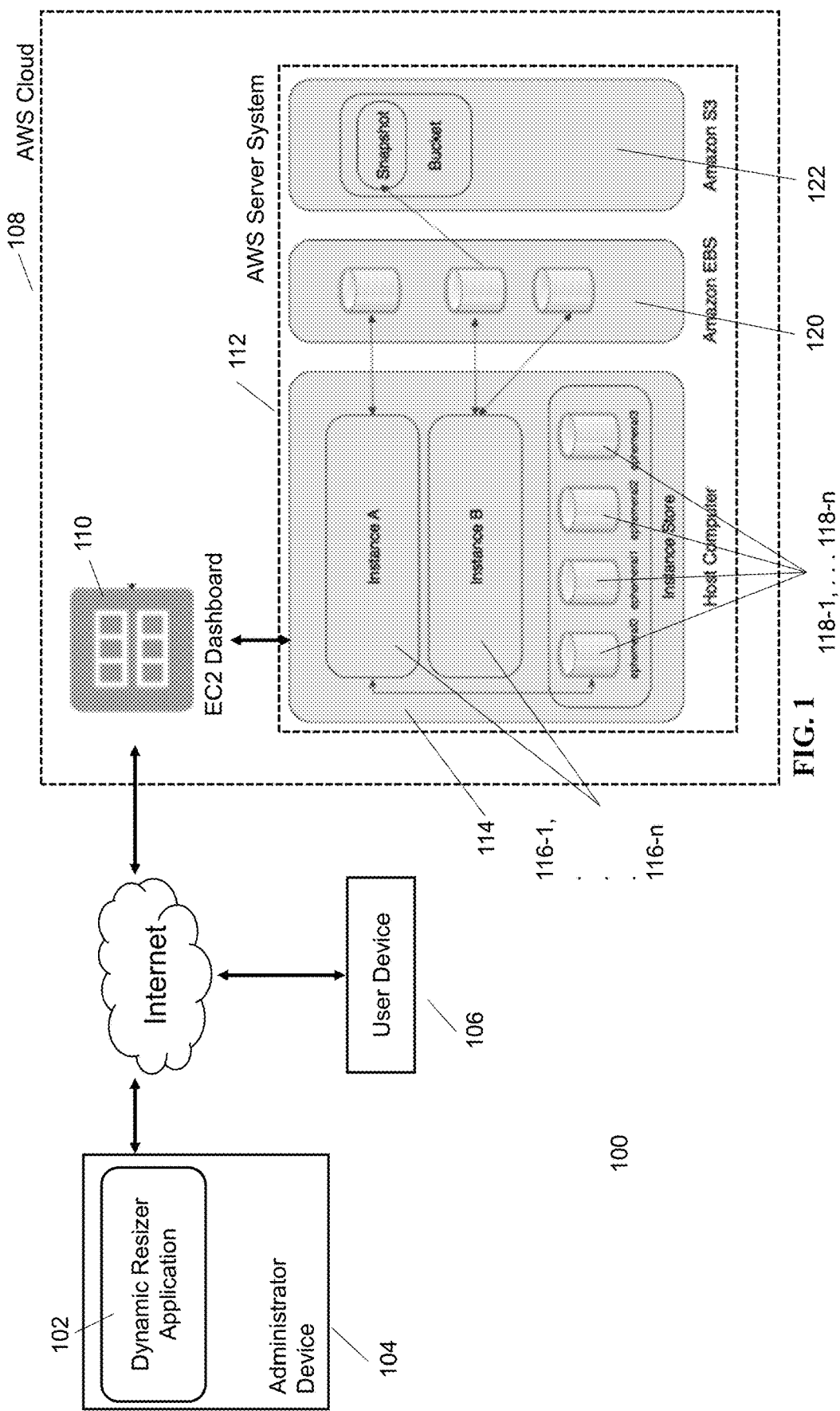
FIG. 1 is a schematic illustration of a system for optimizing computer processing power in a cloud computing system in accordance with embodiments of the present invention.

FIG. 1 is a schematic illustration of a system 100 for optimizing computer processing power in a cloud computing system 108 in accordance with embodiments of the present invention. In embodiments, the system 100 may include an interactive dynamic resizer application 102 stored on non-volatile computer readable memory operatively connected to an administrator device 104, a user device 106, and a cloud computing system 108. In embodiments, the cloud computing system 108 may include a server system 112 and a server management interface 110. In embodiments, the server management system 112 may include at least one host computer 114 for temporary block-level storage, at least one storage volume 120 for long term block level storage, and at least one repository 122 for host computer backup storage and data recovery. In embodiments, each host computer 114 may include at least one of a plurality of server 116-$n$ instance type families, wherein each server instance type family may include a plurality of server instances 118-$n$. In embodiments, each server 116-$n$ instance type family may include different compute, memory, and storage capabilities. In embodiments, each server instance 118-$n$ within a server 116-$n$ of an instance type family may include at least a plurality of virtual central processing units for computer processing, a volume of memory, and an amount of network bandwidth.

Figure 2:
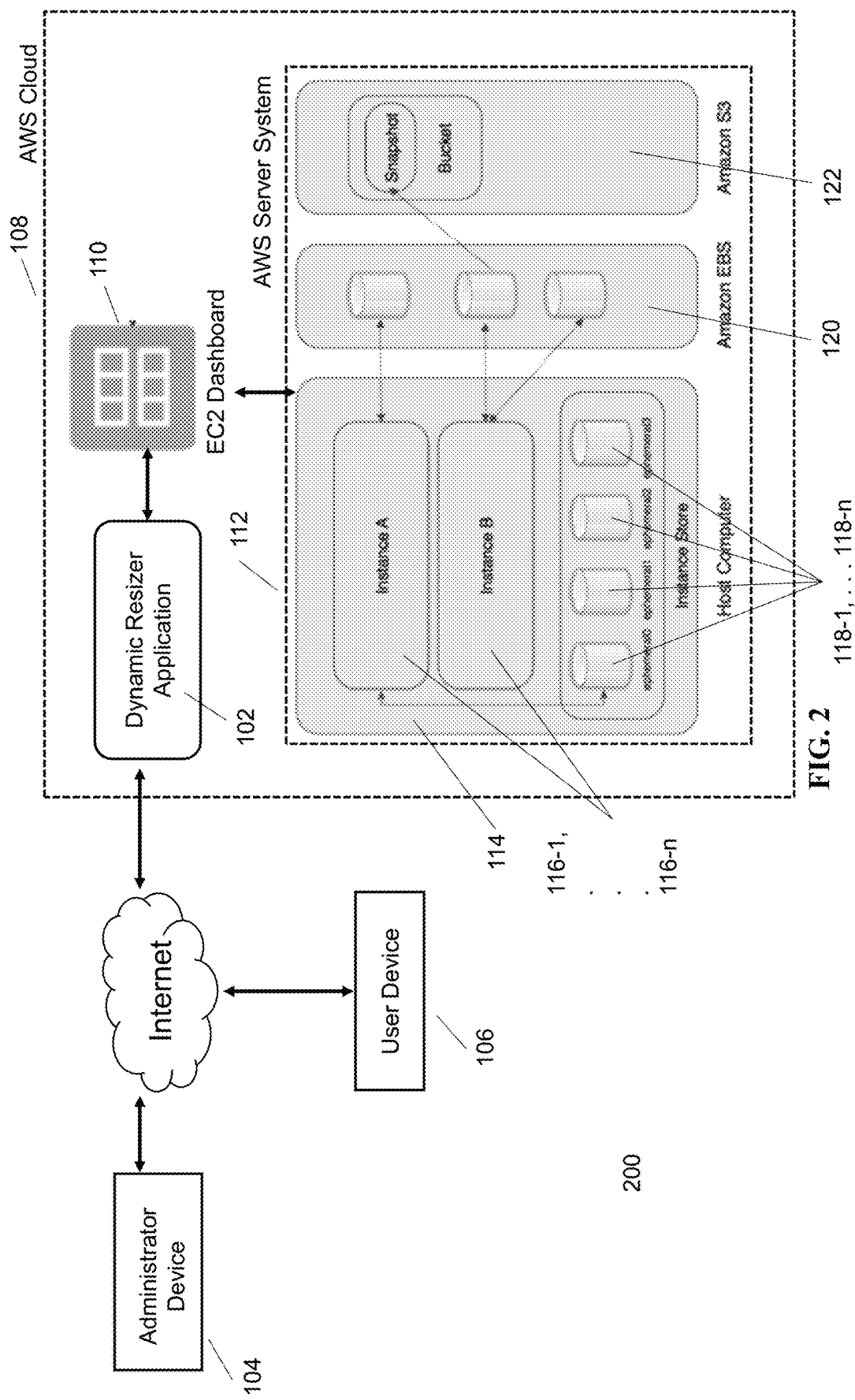
FIG. 2 is a schematic illustration of a system for optimizing computer processing power in a cloud computing system in accordance with another embodiment of the present invention.

FIG. 2 is a schematic illustration of a system for optimizing computer processing power in a cloud computing system in accordance with another embodiment of the present invention. In embodiments, the system 200 may include an administrator device 104, a user device 106, and a cloud computing system 108. In embodiments, the cloud computing system 108 may include a server system 112, a server management interface 110, and an interactive dynamic resizer application 102 stored on non-volatile computer readable memory. In embodiments, the server management system 112 may include at least one host computer 114 for temporary block level storage, at least one storage volume 120 for long term block level storage, and at least one repository 122 for host computer backup storage and data recovery. In embodiments, each host computer 114 may include at least one of a plurality of server 116-$n$ instance type families, wherein each server instance type family may include a plurality of server instances 118-$n$. In embodiments, each server 116-$n$ instance type family may include different compute, memory, and storage capabilities. In embodiments, each server instance 118-*n* within a server 116-*n* instance type family may include at least a plurality of virtual central processing units for computer processing, a volume of memory, and an amount of network bandwidth.

Figure 3:
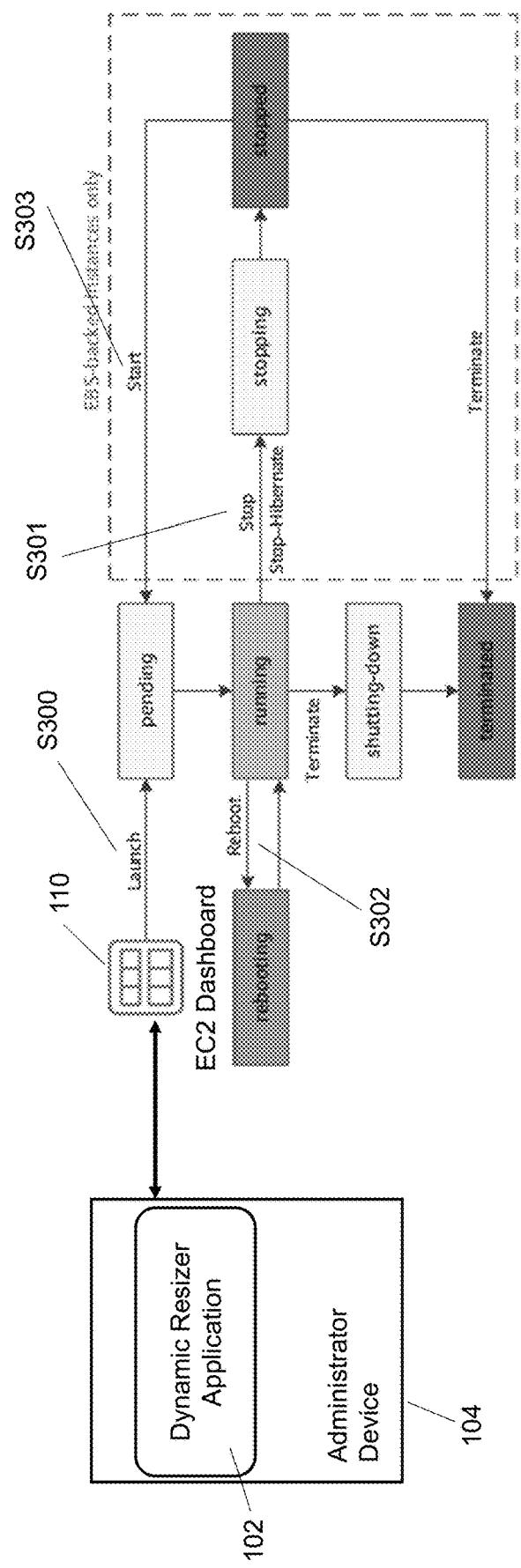
FIG. 3 is an exemplary process flow for a server resizing event in accordance with embodiments of the present invention.

FIG. 3 illustrates an exemplary process flow for a server resizing event in accordance with embodiments of the present invention. In embodiments, a first server instance 118-1 may be launched initially by a user accessing a server management interface 110 on a cloud network 108 and launching the first server instance 118-1 (S300). In embodiments, a server resizing event may include stopping a first running server instance 118-1 of a first server 116 (S301); rebooting the first server 116 (S302); and initializing a second server instance 118-2 (S303).

Figure 4:
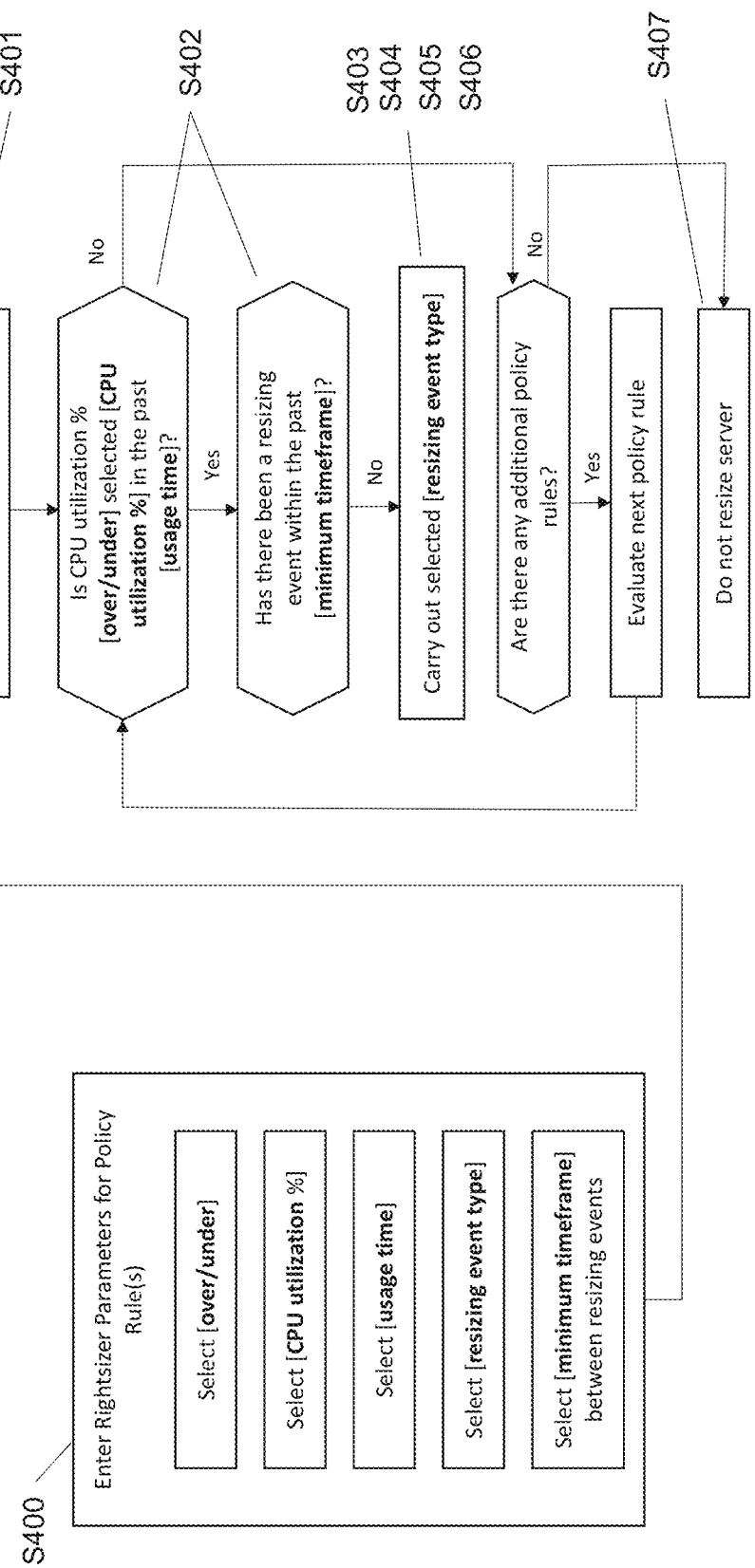
FIG. 4 is an exemplary process flow for a method of optimizing computer processing power in accordance with embodiments of the present invention.

FIG. 4 is an exemplary process flows for a method of optimizing computer processing power in accordance with embodiments of the present invention. In embodiments, the method for automatically selecting a server instance 118-*n* on a cloud network 108 from a first set of server instances 118 associated with a first server 116, wherein the first set of server instances 118 includes at least a first server instance 118-1 and a second server instance 118-2, may include obtaining, by an interactive dynamic resizer application 102 implemented using computer executable instructions stored on non-volatile computer readable memory operatively connected to an administrator device 104, and executed by at least one processor of the administrator device, status information of the first server instance 118-1. In embodiments, the status information may include current virtual computing power capacity usage percentage and current time information (S401). In embodiments, the current virtual computing power capacity usage percentage may indicate a percentage of the total virtual computing power capacity of the first server instance 118-1 that is currently being used. In embodiments, the current time information may be associated with a length of time during which the first server instance 118-1 has been running at the current virtual computing power capacity usage percentage.

In embodiments, the method may include, at step S402, accessing, by the interactive dynamic resizer application 102, policy rule information associated with the first set of server instances 118 associated with the first server 116. The policy rule information may include a usage time threshold associated with a length of time during which a respective server instance 118-*n* of the first set of server instances 118 has been running at the current virtual computing power capacity usage percentage. In embodiments, the policy rule information may include a virtual computing power capacity percentage threshold associated with a percentage of computing power capacity of the respective server instance 118-*n*. In embodiments, the policy rule information may also include resizing event type information indicating a selection of a second server instance 118-2 based at least on the prior usage of time threshold and the virtual computing power capacity percentage threshold. In embodiments, the resizing event type information may include respective direction information associated with a respective virtual computing power capacity percentage threshold wherein the respective direction information indicates whether the respective threshold represents a maximum value such that values "over" the threshold will result in a selection of a second server instance 118-2 with a larger virtual computing power capacity or a minimum value such that values "under" the threshold will result in a selection of a second server instance 118-2 with a lower virtual computing power capacity. In embodiments, the method may further include providing a policy rules engine wherein the policy rule information for each server 116 may be provided to or accessed by the policy rules engine and the policy rules engine may apply the policy rules information as one or more rules to select the second server instance. In embodiments, the policy rule information may further include a minimum timeframe between resizing events of the respective server 116. In embodiments, the policy rule information may include a scheduled at which the interactive dynamic resizer application 102 may access policy rule information (S400B of FIG. 5). In embodiments, the policy rule information may be input by a user or administrator in discrete fields as indicated in step S400 of FIG. 4, for example. In embodiments, the policy rule information may be stored in one or more memory element or databases and retrieved or accessed by the interactive dynamic resizer application 102. In embodiments, the policy rule information may be stored in one or more memory element or databases and retrieved or accessed by the policy rules engine.

In embodiments, the method may include identifying, by the interactive dynamic resizer application 102, the second server instance 118-2 based on the status information and the policy rules information (S403). In embodiments, this identifying step may include evaluating a first rule or first portion of the policy rule information as indicated at step S401 of FIG. 4. In embodiments, the method may further include analyzing, by the interactive dynamic resizer application 102, the status information based on the policy rules information. In embodiments, for example at step S402, the method may include comparing, by the interactive dynamic resizer application 102, the status information to the policy rule information. In embodiments, the method may further include determining, by the interactive dynamic resizer application 102, the second server instance 118-2 based on the comparison of the status information and the policy rule information.

In embodiments, the method may include monitoring, by the interactive dynamic resizer application 102, the status information. In embodiments, for example, the interactive dynamic resizer application 102 may use an application program interface (API) to call the status information by using "getValue( )" and "getState( )" methods of a "Server-Monitor" class for each server instance 118-*n* by iterating through each server instance 118-2, obtaining virtual a computing power utilization percentage for each server instance and creating a data entry for the status information in a database or other memory. In embodiments, the status information may be received by the interactive dynamic resizer application 102 and analyzed and saved to the database.

In embodiments, the method may include automatically selecting (at step S404), by the interactive dynamic resizer application 102, the second server instance based on the comparison of the status information to the policy rule information at step S402, for example. In embodiments, the method may include automatically triggering, by the interactive dynamic resizer application 102, a selection of the second server instance 118-2 as indicated at step S404. In embodiments, when the current usage time exceeds the prior usage time threshold and the current virtual computing power capacity percentage exceeds the threshold virtual computing power capacity percentage and the threshold is associated with an "over" direction, the interactive dynamic resizer application 102 may automatically trigger a selection of the second server instance 118-2, where the second server instance 118-2 may have a larger virtual computing power capacity than the first server instance 118-1. In embodiments, when the current usage time exceeds the prior usage time threshold and the current virtual computing power capacity percentage exceeds the threshold virtual computing power capacity percentage and the threshold is associated with an "over" direction, the interactive dynamic resizer application 102 may automatically trigger a selection of the second server instance 118-2, where there may be no other server instance in the first set of server instances 118 that has a larger virtual computing power capacity than the first server instance 118-1 and a smaller virtual computing power capacity than the second server instance 118-2. In embodiments, when the current time exceeds the prior usage time threshold and the current virtual computing power capacity percentage exceeds the threshold virtual computing power capacity percentage and the threshold is associated with an "over" direction, the interactive dynamic resizer application 102 may automatically trigger a selection of the second server instance 118-2, where there may be a third server instance 118-3 in the first set of server instances 118 which has a larger virtual computing power capacity than the first server instance 118-1 but a smaller virtual computing power capacity than the second server instance 118-2. In embodiments, when the current time exceeds the prior usage time threshold and the current virtual computing power capacity percentage is lower than the threshold virtual computing power capacity percentage and the threshold is associated with an "under" direction, the interactive dynamic resizer application 102 may automatically trigger a selection of the second server instance 118-2, where the second server instance 118-2 may have a smaller virtual computing power capacity than the first server instance 118-1. In embodiments, when the current time exceeds the prior usage time threshold and the current virtual computing power capacity percentage is lower by more than a predetermined amount than the threshold virtual computing power capacity percentage and the threshold is associated with an "under" direction, the interactive dynamic resizer application 102 may automatically trigger a selection of the second server instance 118-2, where there may be a third server instance 118-3 in the first set of server instances 118 which has a smaller virtual computing power capacity than the first server instance 118-1 but a larger virtual computing power capacity than the second server instance 118-2. In embodiments, when the current time exceeds the prior usage time threshold and the current virtual computing power capacity percentage is lower by more than a predetermined amount than the threshold virtual computing power capacity percentage and the threshold is associated with an "under" direction, the interactive dynamic resizer application 102 may automatically trigger a selection of the second server instance 118-2, where there may be a fourth server instance 118-4 in the first set of server instances 118 which has a smaller virtual computing power capacity than the third server instance 118-3 but a larger virtual computing power capacity than the second server instance 118-2. In embodiments, when the current time exceeds the prior usage time threshold and the current virtual computing power capacity percentage is lower by more than a predetermined amount than the threshold virtual computing power capacity percentage and the threshold is associated with an "under" direction, the interactive dynamic resizer application 102 may automatically trigger a selection of the second server instance 118-2, where there may be fifth server instance 118-5 in the first set of server instances 118 which has a smaller virtual computing power capacity than the fourth server instance 118-4 but a larger virtual computing power capacity than the second server instance 118-2. In embodiments, when the current time exceeds the prior usage time threshold and the current virtual computing power capacity percentage is lower by more than a predetermined amount than the threshold virtual computing power capacity percentage and the threshold is associated with an "under" direction, the interactive dynamic resizer application 102 may automatically trigger a selection of the second server instance 118-2, where there may be no other server instance in the first set of server instances 118 that has a smaller virtual computing power capacity than the first server instance 118-1 and a larger virtual computing power capacity than the second server instance 118-2.

In embodiments, when the current time exceeds the prior usage time threshold and the current virtual computing power capacity percentage is lower than the threshold virtual computing power capacity percentage and the threshold is associated with an "over" direction, the interactive dynamic resizer application may not trigger a selection of the second server instance 118-2, such that there may be no change in server instance size (S407). In embodiments, when the current time exceeds the prior usage time threshold and the current virtual computing power capacity percentage exceeds the threshold virtual computing power capacity percentage and the threshold is associated with an "under" direction, the interactive dynamic resizer application may not trigger a selection of the second server instance 118-2, such that there may be no change in server instance size (S407).

In embodiments, when the current time does not exceed the prior usage time threshold and the current virtual computing power capacity percentage exceeds the threshold virtual computing power capacity percentage and the threshold is associated with an "over" direction, the interactive dynamic resizer application may not trigger a selection of the second server instance 118-2, such that there may be no change in server instance size (S407). In embodiments, when the current time does not exceed the prior usage time threshold and the current virtual computing power capacity percentage is under the threshold virtual computing power capacity percentage and the threshold is associated with an "under" direction, the interactive dynamic resizer application may not trigger a selection of the second server instance 118-2, such that there may be no change in server instance size (S407).

In embodiments, as noted above, the policy rule information may include a minimum timeframe between resizing events. In embodiments, where a timeframe between a current time and a prior resizing event is less than the minimum time frame there may be no change in server instance size (S407).

In embodiments, the method may include generating, at S405, by the interactive dynamic resizer application 102, resizing instructions based on the selected second server instance 118-2, wherein the resizing instructions may include instructions to stop the first server instance 118-1 and instructions to start the second server instance 118-2. In embodiments, for example, the resizing instructions for stopping the first server instance 118-1 may include a "stopInstance( )" method. In embodiments, for example, the resizing instructions for starting the second server instance 118- may include a "startInstance( )" method. In embodiments, the resizing instructions may implement the follow pseudocode:

```
/**
 * EC2Access.java
 *
 * Created on Sep 29, 2020.
 *
 * Description:
 *
 * Copyright (C) Sep 29, 2020 by Stephen L. Reed.
 */
package com.aiblockchain.serverRightsizer;
import com.aiblockchain.serverRightsizer.skill.ServerMonitor;
import com.aiblockchain.serverRightsizer.skill.ServerRightsizer.ServerInfo;
import com.amazonaws.auth.profile.ProfileCredentialsProvider;
import com.amazonaws.services.cloudwatch.AmazonCloudWatch;
import com.amazonaws.services.cloudwatch.AmazonCloudWatchClientBuilder;
import com.amazonaws.services.ec2.AmazonEC2;
import com.amazonaws.services.ec2.AmazonEC2ClientBuilder;
import com.amazonaws.services.ec2.model.DescribeInstanceStatusRequest;
import com.amazonaws.services.ec2.model.DescribeInstanceStatusResult;
import com.amazonaws.services.ec2.model.DescribeInstancesRequest;
import com.amazonaws.services.ec2.model.DescribeInstancesResult;
import com.amazonaws.services.ec2.model.Instance;
import com.amazonaws.services.ec2.model.InstanceStatus;
import com.amazonaws.services.ec2.model.ModifyInstanceAttributeRequest;
import com.amazonaws.services.ec2.model.Reservation;
import com.amazonaws.services.ec2.model.StartInstancesRequest;
import com.amazonaws.services.ec2.model.StartInstancesResult;
import com.amazonaws.services.ec2.model.StopInstancesRequest;
import com.amazonaws.services.ec2.model.StopInstancesResult;
import com.amazonaws.services.ec2.model.Tag;
import java.math.BigDecimal;
import java.util.ArrayList;
import java.util.HashMap;
import java.util.List;
import java.util.Map;
import org.apache.log4j.Logger;
import org.texai.util.StringUtils;
import org.texai.util.TexaiException;
public class EC2Access {
    // the logger
    private static final Logger LOGGER = Logger.getLogger(EC2Access.class);
    /**
     * Prevents the instantiation of this utility class.
     */
    private EC2Access( ) {
    }
    /**
     * Obtains the AWS EC2 instances information.
     *
     * @param profileCredentialsProvider the AWS credentials provider
     * @param ec2InstanceInfoDictionary the EC2 instance information dictionary, name
--> EC2InstanceInfo
     */
    public static void obtainEC2InstancesInfo(
            final ProfileCredentialsProvider profileCredentialsProvider,
            final Map<String, ServerMonitor.EC2InstanceInfo> ec2InstanceInfoDictionary)
{
        //Preconditions
        assert profileCredentialsProvider !=null : "ProfileCredentialsProvider must not be
null";
        ec2InstanceInfoDictionary.clear( );
        final AmazonEC2 ec2 = AmazonEC2ClientBuilder
            .standard( )
            .withCredentials(profileCredentialsProvider)
            .withRegion(ServerMonitor.US_EAST_1)
            .build( );
        boolean isDone = false;
        final DescribeInstancesRequest describeInstancesRequest = new
DescribeInstancesRequest( );
        if (LOGGER.isDebugEnabled( )) {
          LOGGER.debug("describeInstancesRequest: " + describeInstancesRequest);
        }
        while (!isDone) {
          final DescribeInstancesResult describeInstancesResult =
ec2.describeInstances(describeInstancesRequest);
          if (LOGGER.isDebugEnabled( )) {
            LOGGER.debug("describeInstancesResult: " + describeInstancesResult);
          }
          for (final Reservation reservation : describeInstancesResult.getReservations( )) {
            for (final Instance instance : reservation.getInstances( )) {
              // Found instance with id: i-079aacl836d4a760d, AMI: ami-0bcc094591f354be2,
```

```
type: c5d.2xlarge, state: running, monitoring state: disabled, tags: [{Key: Name,Value:
Intellishoppers}]
//
      if (LOGGER.isDebugEnabled( )) {
        LOGGER. debug(
            "Found EC2 instanceID: " + instance.getInstanceId( )
            + ", imageID: " + instance.getImageId( )
            + ", instanceType: " + instance.getInstanceType( )
            + ", state: " + instance.getState( ).getName( )
            + ", monitoring state: " + instance.getMonitoring( ).getState( )
            + ", tags: " + instance.getTags( ));
      }
      final List<Tag> tags = instance.getTags( );
      String name = null;
      for (final Tag tag : tags) {
        if (tag.getKey( ).equals("Name")) {
          name = tag.getValue( );
        }
      }
      if (name == null) {
        throw new TexaiException("no Name tag for EC2 instanceID " +
instance.getInstanceId( ));
      }
      final ServerMonitor.EC2InstanceInfo ec2InstanceInfo = new
ServerMonitor.EC2InstanceInfo(
            name, // name,
            instance.getInstanceId( ), // instanceID,
            instance.getImageId( ), // imageID
            instance.getInstanceType( ), // instanceType
            instance.getState( ).getName( )); // state
      if (LOGGER.isDebugEnabled( )) {
        LOGGER.debug(ec2InstanceInfo);
      }
      ec2InstanceInfoDictionary.put(ec2InstanceInfo.getInstanceID( ),
ec2InstanceInfo);
    }
  }
  if (LOGGER.isDebugEnabled( )) {
    LOGGER.debug("nextToken: " + describeInstancesResult.getNextToken( ));
  }
  describeInstancesRequest.setNextToken(describeInstancesResult.getNextToken( ));
  if (describeInstancesResult.getNextToken( ) == null) {
    isDone = true;
  }
}
// iterate through the EC2 instances, obtaining CPU utilization, and storage read
bytes
    final AmazonCloudWatch amazonCloudWatch = AmazonCloudWatchClientBuilder
        .standard( )
        .withCredentials(profileCredentialsProvider)
        .withRegion(ServerMonitor. US_EAST_1)
        .build( );
// the previous CPUUtilization dictionary, instance ID --> previous CPU percent
utilization
    final Map<String, BigDecimal> previousCPUUtilizationDictionary = new
HashMap<>( );
    for (final Map.Entry<String, ServerMonitor.EC2InstanceInfo> entry :
ec2InstanceInfoDictionary.entrySet( )) {
      final ServerMonitor.EC2InstanceInfo ec2InstanceInfo = entry.getValue( );
      ServerMonitor.populateEC2InstanceMetrics(
          profileCredentialsProvider,
          amazonCloudWatch,
          ec2InstanceInfo,
          previousCPUUtilizationDictionary);
    }
    if (LOGGER.isDebugEnabled( )) {
      LOGGER. debug("ec2InstanceInfoDictionary...\n");
      for (final Map.Entry<String, ServerMonitor.EC2InstanceInfo> entry :
ec2InstanceInfoDictionary.entrySet( )) {
        LOGGER.debug(entry.getKey( ) + " --> " + entry.getValue( ));
      }
    }
  }
}
/**
 * Provides a container for the progress bar fraction complete value.
 */
private static class ProgressBarFractionCompleteHolder {
  double progressBarFractionComplete;
  ProgressBarFractionCompleteHolder(final double progressBarFractionComplete) {
```

```
        this.progressBarFractionComplete = progressBarFractionComplete;
    }
}
/**
 * Restarts the given AWS EC2 instance with a given instance type, for example t2.micro.
 *
 * @param serverinfo the server information
 * @param profileCredentialsProvider the AWS credentials provider
 * @param currentInstanceType the current instance type
 * @param newInstanceType the new instance type
 * @param ec2AccessNotificationReceiver the parent skill which receives notifications during an instance resizing
 * @param sessionCookie the session cookie
 * @param expectedDowntimeMinutes the expected server downtime used for the progress bar
 * @param serverStatusElementID the server status element ID on the client web browser
 *
 * @return the resizing event duration minutes
 */
public static float restartServerWithInstanceType(
        final ServerInfo serverInfo,
        final ProfileCredentialsProvider profileCredentialsProvider,
        final String currentInstanceType,
        final String newInstanceType,
        final EC2AccessNotificationReceiver ec2AccessNotificationReceiver,
        final String sessionCookie,
        final double expectedDowntimeMinutes,
        final String serverStatusElementID) {
    //Preconditions
    assert serverInfo != null : "serverinfo must not be null";
    assert profileCredentialsProvider !=null : "ProfileCredentialsProvider must not be null";
    assert StringUtils.isNonEmptyString(newInstanceType) : "instanceType must be a non-empty character string";
    assert !newInstanceType.equals(currentInstanceType) : "newInstanceType must be different than currentInstanceType";
    final String instanceID = serverInfo.getInstanceID( );
    final String region = serverInfo.getRegion( );
    LOGGER.info("restarting instanceID: " + instanceID
            + ", with current instanceType: " + currentInstanceType
            + ", with new instanceType: " + newInstanceType
            + ", in region: " + region
            + ", expected downtime minutes: " + expectedDowntimeMinutes);
    double progressBarFractionComplete = 0.0;
    final long expectedDowntimeMillis = (long) (expectedDowntimeMinutes * 60000.0);
    final long startTimeMillis = System.currentTimeMillis( );
    final long startMillis = System.currentTimeMillis( );
    final AmazonEC2 ec2 = AmazonEC2ClientBuilder
          .standard( )
          .withCredentials(profileCredentialsProvider)
          .withRegion(region)
          .build( );
    LOGGER.info("1. stopping '" + instanceID + "'...");
    final ProgressBarFractionCompleteHolder progressBarFractionCompleteHolder;
    if (ec2AccessNotificationReceiver == null) {
      progressBarFractionCompleteHolder = null;
    } else {
      progressBarFractionCompleteHolder = new ProgressBarFractionCompleteHolder(progressBarFractionComplete);
    }
    stopInstance(
            serverInfo,
            ec2,
            ec2AccessNotificationReceiver,
            progressBarFractionCompleteHolder,
            newInstanceType,
            sessionCookie,
            startTimeMillis,
            expectedDowntimeMillis,
            serverStatusElementID);
    // modify the instance type
    final ModifyInstanceAttributeRequest modifyInstanceAttributeRequest = new ModifyInstanceAttributeRequest( ).withInstanceId(instanceID).withInstanceType(newInstanceType);
    ec2.modifyInstanceAttribute(modifyInstanceAttributeRequest);
    LOGGER.info("2. modifying instanceType of'" + instanceID + "' from " +
```

```
currentInstanceType + ", to " + newInstanceType);
    // start the instance
    LOGGER.info("3. starting '" + instanceID + "'...");
    startInstance(
            serverInfo,
            ec2,
            ec2AccessNotificationReceiver,
            progressBarFractionCompleteHolder,
            newInstanceType,
            sessionCookie,
            startTimeMillis,
            expectedDowntimeMillis,
            serverStatusElementID);
    long durationMillis = System.currentTimeMillis( ) - startMillis;
    float minutesDuration = ((float) durationMillis) / 60_000.0f;
    LOGGER.info("instanceID: " + instanceID
            + ", is now running with new instancType: " + newInstanceType);
    LOGGER.info("duration: " + minutesDuration);
    return minutesDuration;
}
/**
 * Starts the given instance.
 *
 * @param serverInfo the server information
 * @param ec2 the Amazon EC2 API object
 * @param ec2AccessNotificationReceiver receives notification of a resized AWS
instance state change, such as "running"
 * @param progressBarFractionCompleteHolder the holder for the progress bar
fraction complete value
 * @param newInstanceType the new instance type
 * @param sessionCookie the session cookie which is associated with the
communication channel to the client web browser, and to its
 * session storage
 * @param startTimeMillis the operation start time measured in milliseconds
 * @param expectedDowntimeMillis the expected downtime measured in
milliseconds which is used to scale the progress bar on the user
 * interface
 * @param serverStatusElementID the server status element ID
 */
public static void startInstance(
        final ServerInfo serverInfo,
        final AmazonEC2 ec2,
        final EC2AccessNotificationReceiver ec2AccessNotificationReceiver,
        final ProgressBarFractionCompleteHolder progressBarFractionCompleteHolder,
        final String newInstanceType,
        final String sessionCookie,
        final long startTimeMillis,
        final long expectedDowntimeMillis,
        final String serverStatusElementID) {
    assert serverInfo != null : "serverInfo must not be null";
    assert ec2 != null : "ec2 must not be null";
    assert startTimeMillis > 0L : "startTimeMillis must be positive";
    assert expectedDowntimeMillis >= 0L : "expectedDowntimeMillis must not be
negative";
    assert (ec2AccessNotificationReceiver == null &&
progressBarFractionCompleteHolder == null && serverStatusElementID == null)
            || (ec2AccessNotificationReceiver != null &&
progressBarFractionCompleteHolder != null && serverStatusElementID != null) :
            "when ec2AccessNotificationReceiver is null, then
progressBarFractionCompleteHolder and serverStatusElementID must also be null";
    final List<String> instanceIds = new ArrayList<>( );
    final String instanceID = serverinfo.getInstanceID( );
    instanceIds.add(instanceID);
    final StartInstancesRequest startInstancesRequest = new
StartInstancesRequest(instanceIds);
    if (LOGGER.isDebugEnabled( )) {
      LOGGER.info("startInstancesRequest: " + startInstancesRequest);
    }
    final StartInstancesResult startInstancesResult =
ec2.startInstances(startInstancesRequest);
    if (LOGGER.isDebugEnabled( )) {
      LOGGER.info("startInstancesResult: " + startInstancesResult);
    }
    final DescribeInstancesRequest describeInstancesRequest = new
DescribeInstancesRequest( ).withInstanceIds(instanceIds);
    boolean isSwitchToGreen = false;
    boolean isSwitchedToGreen = false;
    boolean!isInstanceRunning = false;
    while (!isInstanceRunning) {
```

```
      final DescribeInstancesResult describeInstancesResult =
ec2.describeInstances(describeInstancesRequest);
      for (final Reservation reservation : describeInstancesResult.getReservations( )) {
        for (final Instance instance : reservation.getInstances( )) {
          if (instance.getInstanceId( ).equals(instanceID)) {
            final String instanceState = instance.getState( ).getName( );
            LOGGER.info(" instance '" + instanceID + "' is " + instanceState);
            serverInfo.setState(instanceState);
            if (ec2AccessNotificationReceiver != null) {
              progressBarFractionCompleteHolder.progressBarFractionComplete =
progressBarFractionComplete(
                  expectedDowntimeMillis,
                  startTimeMillis);
              if (instanceState.equals("running")) {
                if (isSwitchedToGreen) {
                  isSwitchToGreen = false;
                } else {
                  isSwitchToGreen = true;
                  isSwitchedToGreen = true;
                }
              }
              ec2AccessNotificationReceiver.receiveEC2AccessNotification(
                  instanceID,
                  newInstanceType,
                  instanceState,
                  sessionCookie,
                  progressBarFractionCompleteHolder.progressBarFractionComplete,
                  isSwitchToGreen,
                  serverStatusElementID);
            }
            if (instanceState.equals("running")) {
              isInstanceRunning = true;
            } else {
              try {
              // sleep 10 seconds between polling the instance state
              Thread.sleep(10_000);
              } catch (InterruptedException ex) {
              // ignore
              }
            }
          }
        }
      }
    }
    boolean isInstanceInitialized = false;
    while (!isInstanceInitialized) {
      final DescribeInstanceStatusResult result = ec2
          .describeInstanceStatus(
              newDescribeInstanceStatusRequest( )
                  .withInstanceIds(instanceID));
      final List<InstanceStatus> instancestatuses = result.getInstanceStatuses( );
      boolean isInstanceStatusOK;
      boolean isSystemStatusOK;
      for (final InstanceStatus instanceStatus : instanceStatuses) {
        LOGGER.info(" InstanceStatus.instanceStatus: " +
instanceStatus.getInstanceStatus( ).getStatus( ));
        LOGGER.info(" SystemStatus:        " +
instanceStatus.getSystemStatus( ).getStatus( ));
        isInstanceStatusOK =
("ok".equals(instanceStatus.getInstanceStatus( ).getStatus( )));
        isSystemStatusOK = ("ok".equals(instanceStatus.getSystemStatus( ).getStatus( )));
        if (ec2AccessNotificationReceiver != null) {
          progressBarFractionCompleteHolder.progressBarFractionComplete =
progressBarFractionComplete(
              expectedDowntimeMillis,
              startTimeMillis);
          ec2AccessNotificationReceiver.receiveEC2AccessNotification(
              instanceID,
              newInstanceType,
              instanceStatus.getInstanceStatus( ).getStatus( ),
              sessionCookie,
              progressBarFractionCompleteHolder.progressBarFractionComplete,
              false, // isSwitchToGreen
              serverStatusElementID);
        }
        isInstanceInitialized = isInstanceStatusOK && isSystemStatusOK;
      }
      if (isinstanceInitialized) {
      break;
```

```
      } else {
        try {
          // sleep 10 seconds between polling the instance state
          Thread.sleep(10_000);
        } catch (InterruptedException ex) {
          // ignore
        }
      }
    }
  }
}
/**
 * Stops the given instance.
 *
 * @param serverinfo the server information
 * @param ec2 the Amazon EC2 API object
 * @param ec2AccessNotificationReceiver receives notification of a resized AWS
instance state change, such as "running"
 * @param progressBarFractionCompleteHolder the holder for the progress bar
fraction complete value
 * @param newInstanceType the new instance type
 * @param sessionCookie the session cookie which is associated with the
communication channel to the client web browser, and to its
 * session storage
 * @param startTimeMillis the operation start time measured in milliseconds
 * @param expectedDowntimeMillis the expected downtime measured in
milliseconds which is used to scale the progress bar on the user
 * interface
 * @param serverStatusElementID the server status element ID
 */
public static void stopInstance(
        final ServerInfo serverInfo,
        final AmazonEC2 ec2,
        final EC2AccessNotificationReceiver ec2AccessNotificationReceiver,
        final ProgressBarFractionCompleteHolder progressBarFractionCompleteHolder,
        final String newInstanceType,
        final String sessionCookie,
        final long startTimeMillis,
        final long expectedDowntimeMillis,
        final String serverStatusElementID) {
  //Preconditions
  assert serverInfo != null : "serverInfo must not be null";
  assert ec2 != null : "ec2 must not be null";
  assert startTimeMillis > 0L : "startTimeMillis must be positive";
  assert expectedDowntimeMillis >= 0L : "expectedDowntimeMillis must not be
negative";
  assert (ec2AccessNotificationReceiver == null &&
progressBarFractionCompleteHolder == null && serverStatusElementID == null)
      || (ec2AccessNotificationReceiver != null &&
progressBarFractionCompleteHolder != null && serverStatusElementID != null) :
       "when ec2AccessNotificationReceiver is null, then
progressBarFractionCompleteHolder and serverStatusElementID must also be null";
  final List<String> instanceIds = new ArrayList<>( );
  final String instanceID = serverinfo.getInstanceID( );
  instanceIds.add(instanceID);
  final StopInstancesRequest stopInstancesRequest = new
StopInstancesRequest(instanceIds);
  if (LOGGER.isDebugEnabled( )) {
    LOGGER.info("stopInstancesRequest: " + stopInstancesRequest);
  }
  final StopInstancesResult stopInstancesResult =
ec2.stopInstances(stopInstancesRequest);
  if (LOGGER.isDebugEnabled( )) {
    LOGGER.info("stopInstancesResult: " + stopInstancesResult);
  }
  boolean isInstanceStopped = false;
  final DescribeInstancesRequest describeInstancesRequest = new
DescribeInstancesRequest( ).withInstanceIds(instanceIds);
  if (LOGGER.isDebugEnabled( )) {
    LOGGER.debug("describeInstancesRequest: " + describeInstancesRequest);
  }
  while (!isInstanceStopped) {
    final DescribeInstancesResult describeInstancesResult =
ec2.describeInstances(describeInstancesRequest);
    for (final Reservation reservation : describeInstancesResult.getReservations( )) {
      for (final Instance instance : reservation.getInstances( )) {
        if (instance.getInstanceId( ).equals(instanceID)) {
          final String instanceState = instance.getState( ).getName( );
          LOGGER.info(" instance '" + instanceID + "' is " + instanceState);
          serverInfo.setState(instanceState);
```

```
            if (ec2AccessNotificationReceiver != null) {
                progressBarFractionCompleteHolder.progressBarFractionComplete =
progressBarFractionComplete(
                    expectedDowntimeMillis,
                    startTimeMillis);
                ec2AccessNotificationReceiver.receiveEC2AccessNotification(
                    instanceID,
                    newInstanceType,
                    instanceState,
                    sessionCookie,
                    progressBarFractionCompleteHolder.progressBarFractionComplete,
                    false, // isSwitchToGreen
                    serverStatusElementID);
            }
            if (instanceState.equals("stopped")) {
                isInstanceStopped = true;
            }
            try {
                // sleep 10 seconds between polling the instance state
                Thread.sleep(10_000);
            } catch (InterruptedException ex) {
                // ignore
            }
          }
        }
      }
    }
  }
}
/**
 * Calculate the fraction completion for the progress bar.
 *
 * @param expectedDowntimeMillis the expected server resizing downtime
 * @param startTimeMillis the resizing event start time in milliseconds
 * @return the fraction complete for the progress bar
 */
private static double progressBarFractionComplete(
    final long expectedDowntimeMillis,
    final long startTimeMillis) {
    //Preconditions
    assert expectedDowntimeMillis >= 0 : "expectedDowntimeMillis must not be
negative";
    assert startTimeMillis >= 0 : "startTimeMillis must not be negative";
    final long durationMillis = System.currentTimeMillis( ) - startTimeMillis;
    assert durationMillis > 0;
    LOGGER.info("expectedDowntimeMillis: " + expectedDowntimeMillis);
    LOGGER.info("durationMillis: " + durationMillis);
    final double progressBarFractionComplete;
    if (durationMillis > expectedDowntimeMillis) {
      progressBarFractionComplete = 1.0;
    } else {
      progressBarFractionComplete = ((double) durationMillis) / ((double)
expectedDowntimeMillis);
    }
    LOGGER.info("progressBarFractionComplete: " + progressBarFractionComplete);
    return progressBarFractionComplete;
  }
}
```

In embodiments, the method may include sending, by the interactive dynamic resizer application 102, the resizing instructions to the cloud network 108 (S406). In embodiments, the instructions may be sent to the cloud network 108 via an application programming interface (API).

In embodiments, the method may further include providing, by the interactive dynamic resizer application 102, server instance information associated with each server instance 118-*n* associated with the first set of server instances 118, wherein the server instance information for each server instance may include at least a maximum virtual computing power capacity; a volume of memory; and an amount network bandwidth.

In embodiments, the method may further include verifying that the second server instance 118-2 is running properly.

Figure 21:
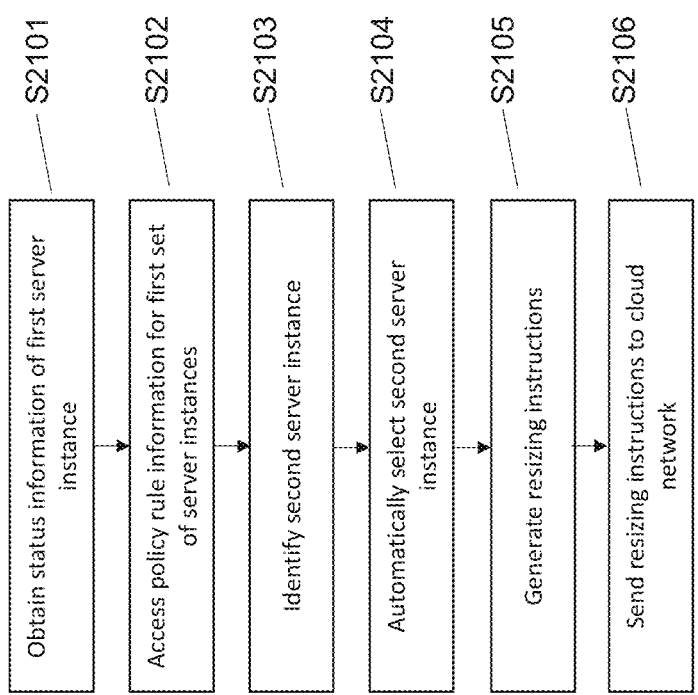
FIG. 21 is an exemplary process flow for a method of optimizing computer processing power in accordance with embodiments of the present invention.

FIG. 21 is an exemplary process flow for a method of optimizing computer processing power in accordance with embodiments of the present invention. In embodiments, the method for automatically selecting a server instance 118-*n* on a cloud network 108 from a first set of server instances 118 associated with a first server 116, wherein the first set of server instances 118 includes at least a first server instance 118-1 and a second server instance 118-2, may include obtaining, by an interactive dynamic resizer application 102 implemented using computer executable instructions stored on non-volatile computer readable memory operatively connected to an administrator device 104, and executed by at least one processor of the administrator device, status information of the first server instance 118-1 (S2101). In embodiments, the status information may include current virtual computing power capacity usage percentage and current time information. In embodiments, the current virtual computing power capacity usage percentage may indicate a percentage of the total virtual computing power capacity of the first server instance 118-1 that is currently being used. In embodiments, the current time information may be associated with a length of time during which the first server instance 118-1 has been running at the current virtual computing power capacity usage percentage.

In embodiments, the method may include, at step S2102, accessing, by the interactive dynamic resizer application 102, policy rule information associated with the first set of server instances 118 associated with the first server 116. The policy rule information may include a usage time threshold associated with a length of time during which a respective server instance 118-n of the first set of server instances 118 has been running at the current virtual computing power capacity usage percentage. In embodiments, the policy rule information may include a virtual computing power capacity percentage threshold associated with a percentage of computing power capacity of the respective server instance 118-n. In embodiments, the policy rule information may also include resizing event type information indicating a selection of a second server instance 118-2 based at least on the prior usage of time threshold and the virtual computing power capacity percentage threshold.

In embodiments, the method may include identifying, by the interactive dynamic resizer application 102, the second server instance 118-2 based on the status information and the policy rules information (S2103).

In embodiments, the method may include automatically selecting (at step S2104), by the interactive dynamic resizer application 102, the second server instance based on the comparison of the status information to the policy rule information at step S2103, for example.

In embodiments, the method may include generating, at S2105, by the interactive dynamic resizer application 102, resizing instructions based on the selected second server instance 118-2, wherein the resizing instructions may include instructions to stop the first server instance 118-1 and instructions to start the second server instance 118-2.

In embodiments, the method may include sending, by the interactive dynamic resizer application 102, the resizing instructions to the cloud network 108 (S2106).

Figure 22:
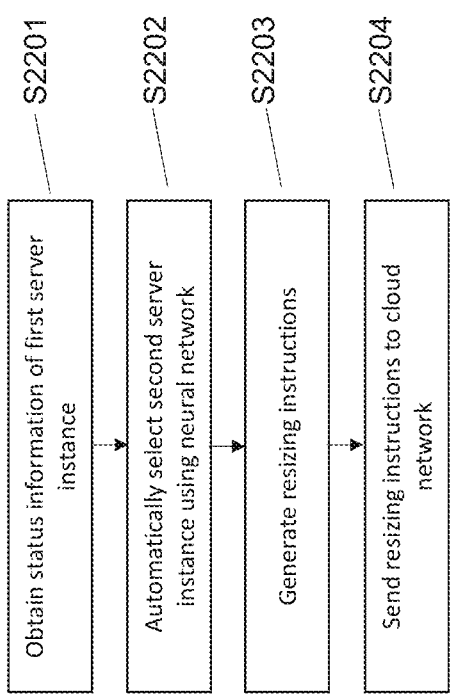
FIG. 22 is an exemplary process flow for a method of optimizing computer processing power in accordance with embodiments of the present invention.

FIG. 22 is an exemplary process flow for a method of optimizing computer processing power in accordance with embodiments of the present invention. In embodiments, a method of automatically selecting a server instance 118-n on a cloud network 108 from a first set of server instances 118 associated with a first server 116, wherein the first set of server instances 118 may include at least a first server instance 118-1 and a second server instance 118-2, may include obtaining, by an interactive dynamic resizer application 102 stored on non-volatile computer readable memory operatively connected to an administrator device 104, status information associated with the first server instance 118-1 of the first server 116 (S2202). In embodiments, the status information may include a prior usage time threshold of the first server instance 118-1 indicating a period of time during which the first server instance has been active. In embodiments, the status information may include current virtual computing power capacity usage percentage of the first server instance 118-1 indicating a percentage of the virtual computing power capacity currently being used by the first server instance. In embodiments, the status information may include a time stamp corresponding to the current virtual computing power capacity usage percentage of the first server instance 118-1.

In embodiments, the method may include automatically selecting, by the interactive dynamic resizer application 102, a second server instance 118-2 using machine learning techniques performed using a neural network trained with a data set including tagged historical status information associated with the first set of server instances 118 of the first server 116 including time stamps and respective resizing events associated therewith (S2202). In embodiments, the neural network may be any type of artificial neural network that may use machine learning techniques to select the second server instance 118-2. In embodiments, the training set may further include tagged scheduled server backup event information. In embodiments, the training set may further include historic web page response time information associated with respective status information provided for each respective server instance 118-n of the first set of server instances 118. In embodiments, the training set may further include average query duration information associated with respective status information for each respective server instance of the first set of server instances 118. In embodiments, the neural network receives an input of the status information of the first server instance.

In embodiments, the method may include generating, by the interactive dynamic resizer application 102, resizing instructions based on the selected second server instance 118-2 (S2203). In embodiments, the method may include sending, by the interactive dynamic resizer application 102, the resizing instructions to the cloud network 108 (S2204). In embodiments, the method may further include providing, by the interactive dynamic resizer application 102, server instance information associated with each server instance 118-n associated with the first set of server instances 118, wherein the server instance information for each server instance may include at least a maximum virtual computing power capacity; a volume of memory; and an amount network bandwidth. In embodiments, the method may further include verifying that the second server instance 118-2 is running properly. In embodiments, the method may further include reporting the resizing event to the user device 106 of a user of the interactive dynamic resizer application 102. In embodiments, the method may further include determining no change of status of the first server 116.

Figure 5:
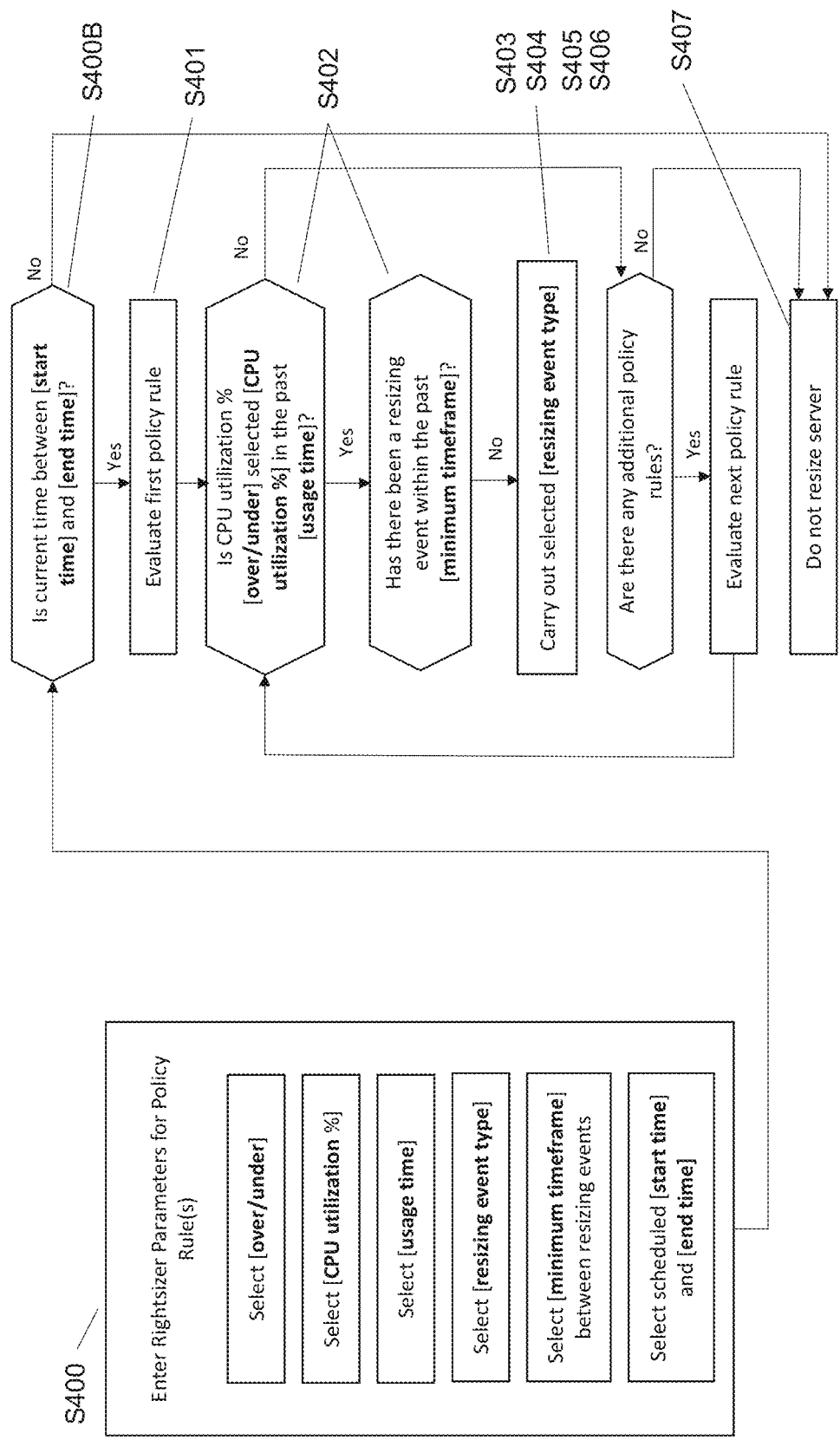
FIGS. 5-6 are exemplary process flows for a method of optimizing computer processing power in accordance with embodiments of the present invention.
Figure 6:
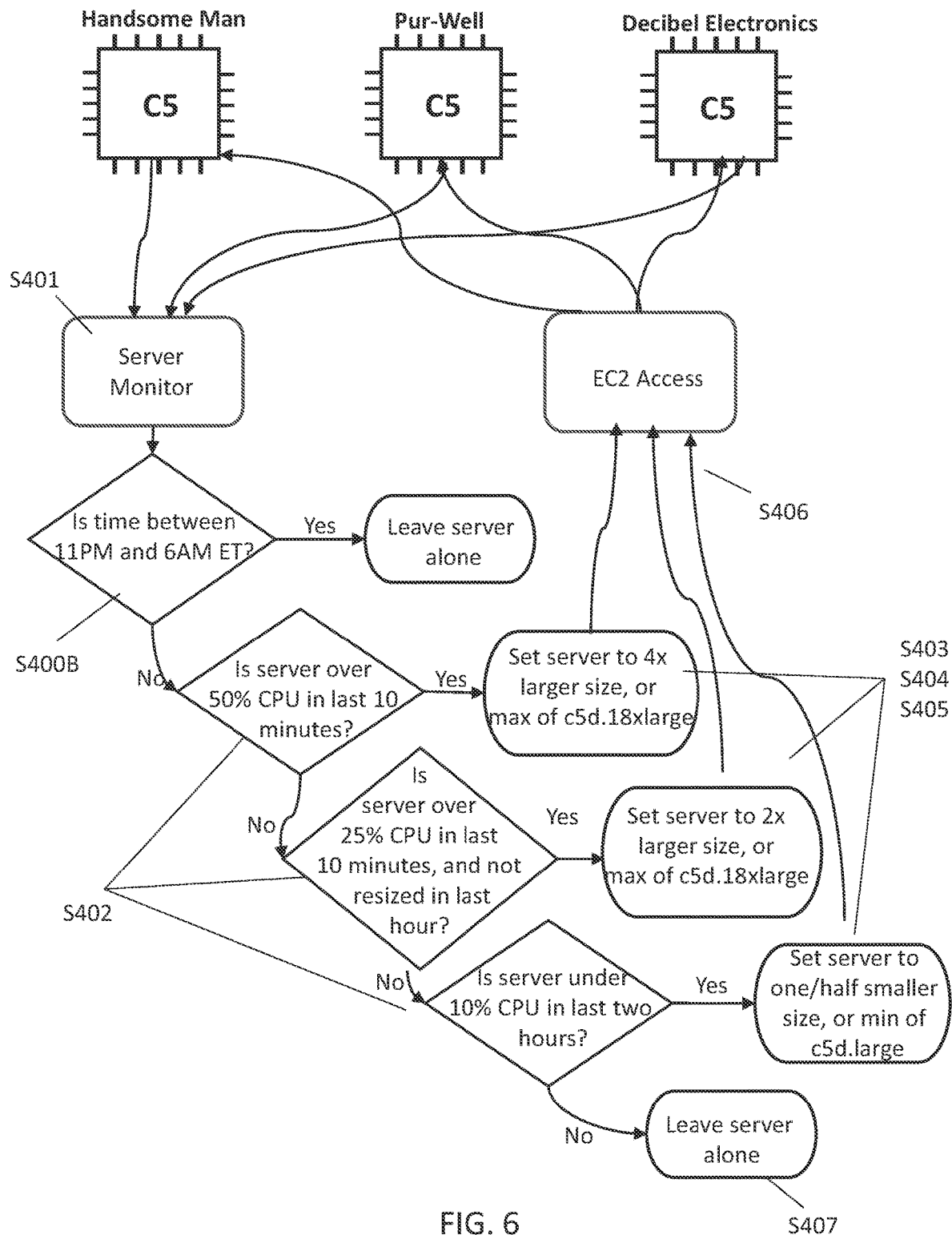

FIGS. 5-6 are schematic illustrations of exemplary process flows for a method of optimizing computer processing power in accordance with embodiments of the present invention. In embodiments, as indicated in FIGS. 5-6, the policy rule information described with respect to the method of FIG. 4 may further include a scheduled time for the interactive dynamic resizer application 102 to access policy rule information and generate resizing instructions (S400B).

FIGS. 7-9 illustrate exemplary server instance types and corresponding computer processer capacity and memory in accordance with embodiments of the present invention. For example, FIG. 6 illustrates examples of server instances within the "c5" and "c5d" server instance families of the Amazon EC2 server system and the corresponding compute, memory, and storage capabilities of each server instance. For example, the "c5d.large" server instance has maximum of 2 vCPUs, 4 GiB memory, and up to 10 Gbps of memory, and the "c5d.xlarge" server instance has a maximum of 4 vCPUs, 8 GiB memory, and up to 10 Gbps of memory. Each server instance may also be allotted an amount of block level storage by the at least one storage volume 120 for long term block level storage. The storage volume 120 may also have an allotted bandwidth.

Figure 10:
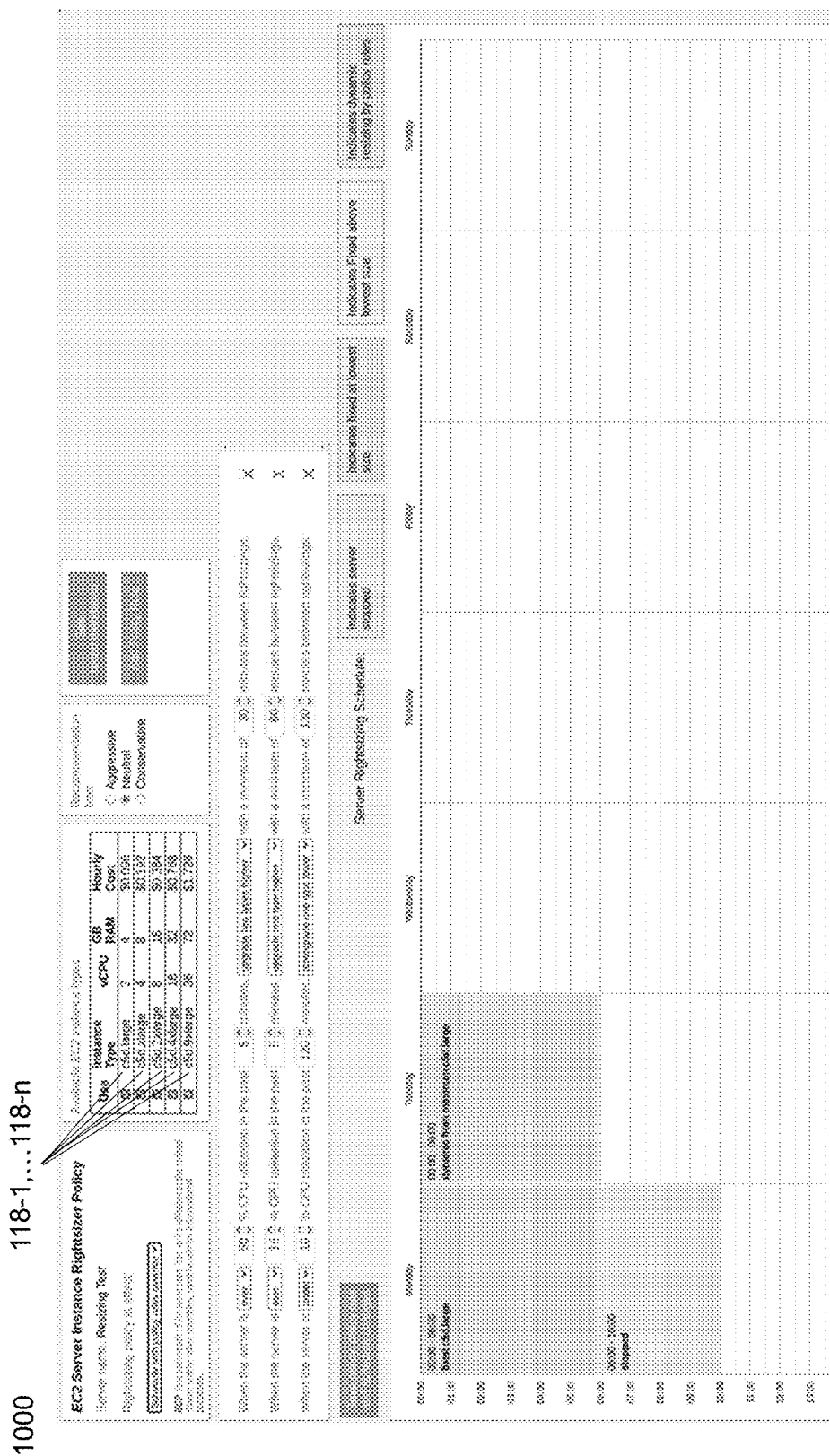
FIG. 10 is a schematic illustration of an interactive dynamic resizer application interface for optimizing computer processing power in a cloud computing system in accordance with an embodiment of the present invention.
Figure 11:
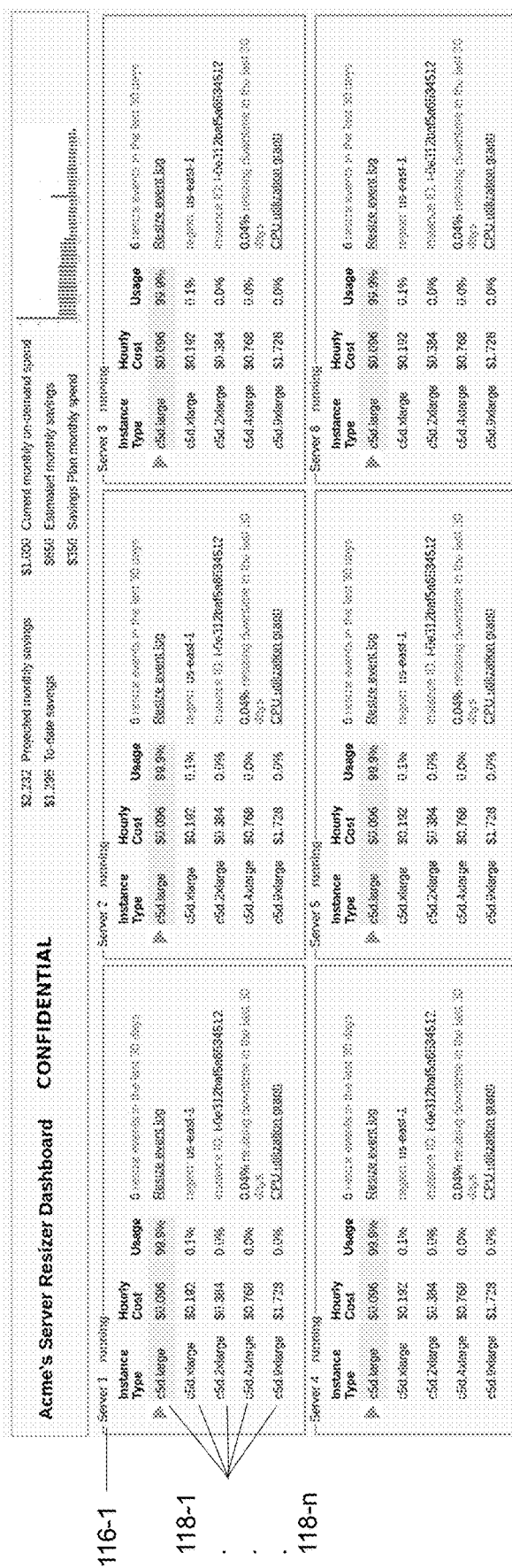
FIG. 11-14 are schematic illustrations of an interactive dynamic resizer application interface for optimizing computer processing power in a cloud computing system in accordance with an embodiment of the present invention.
Figure 12:
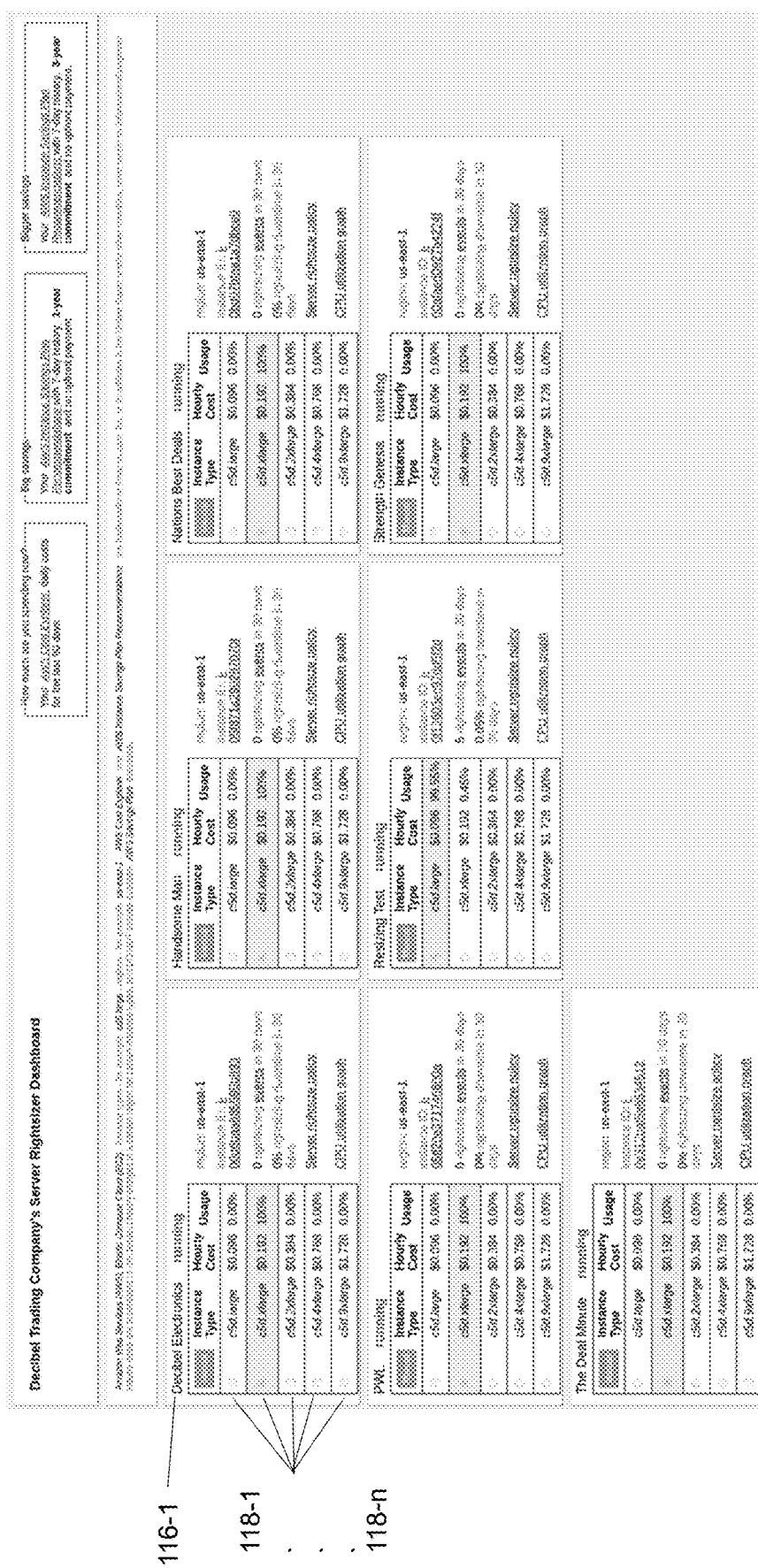
Figure 13:
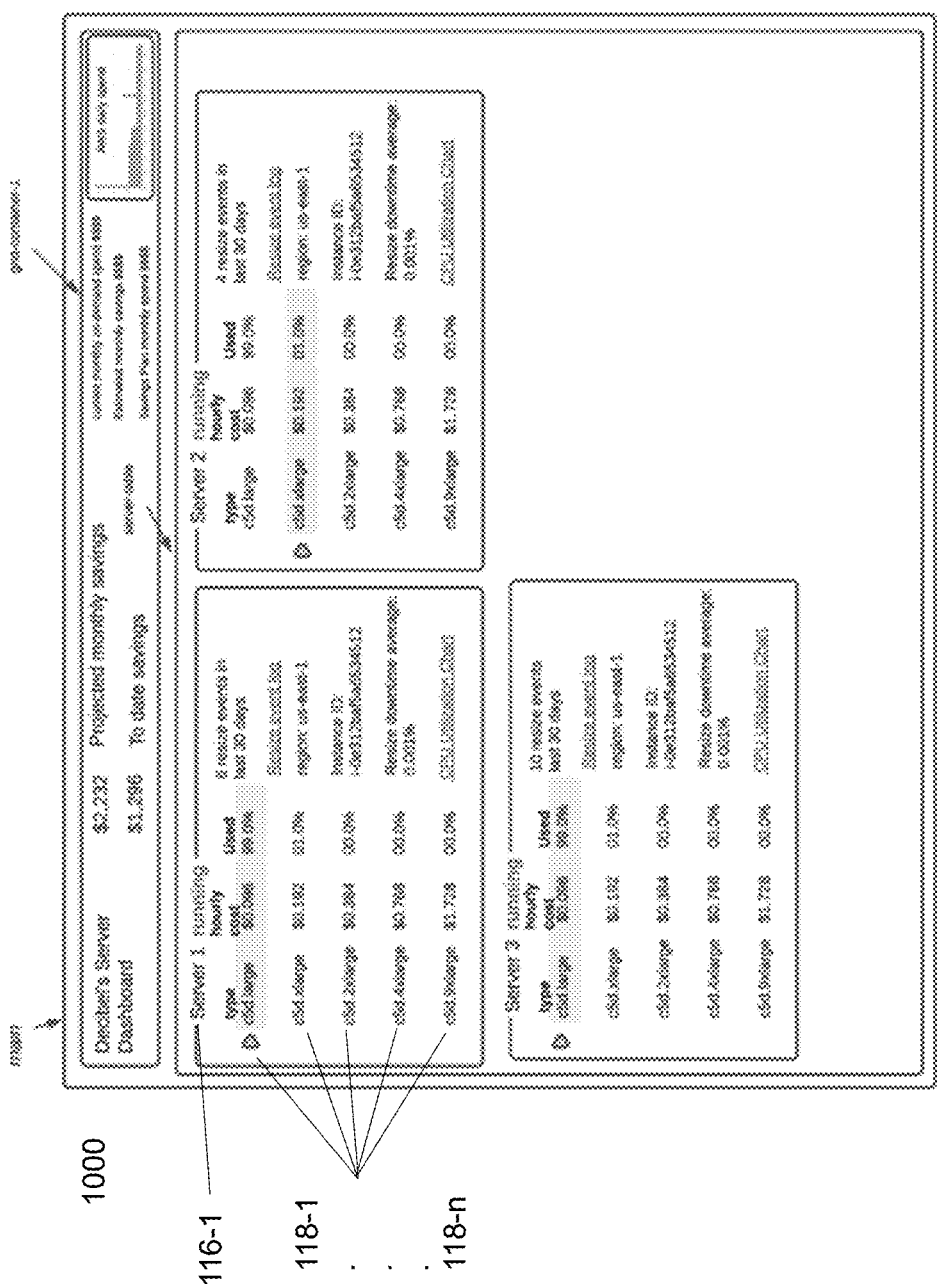
Figure 14:
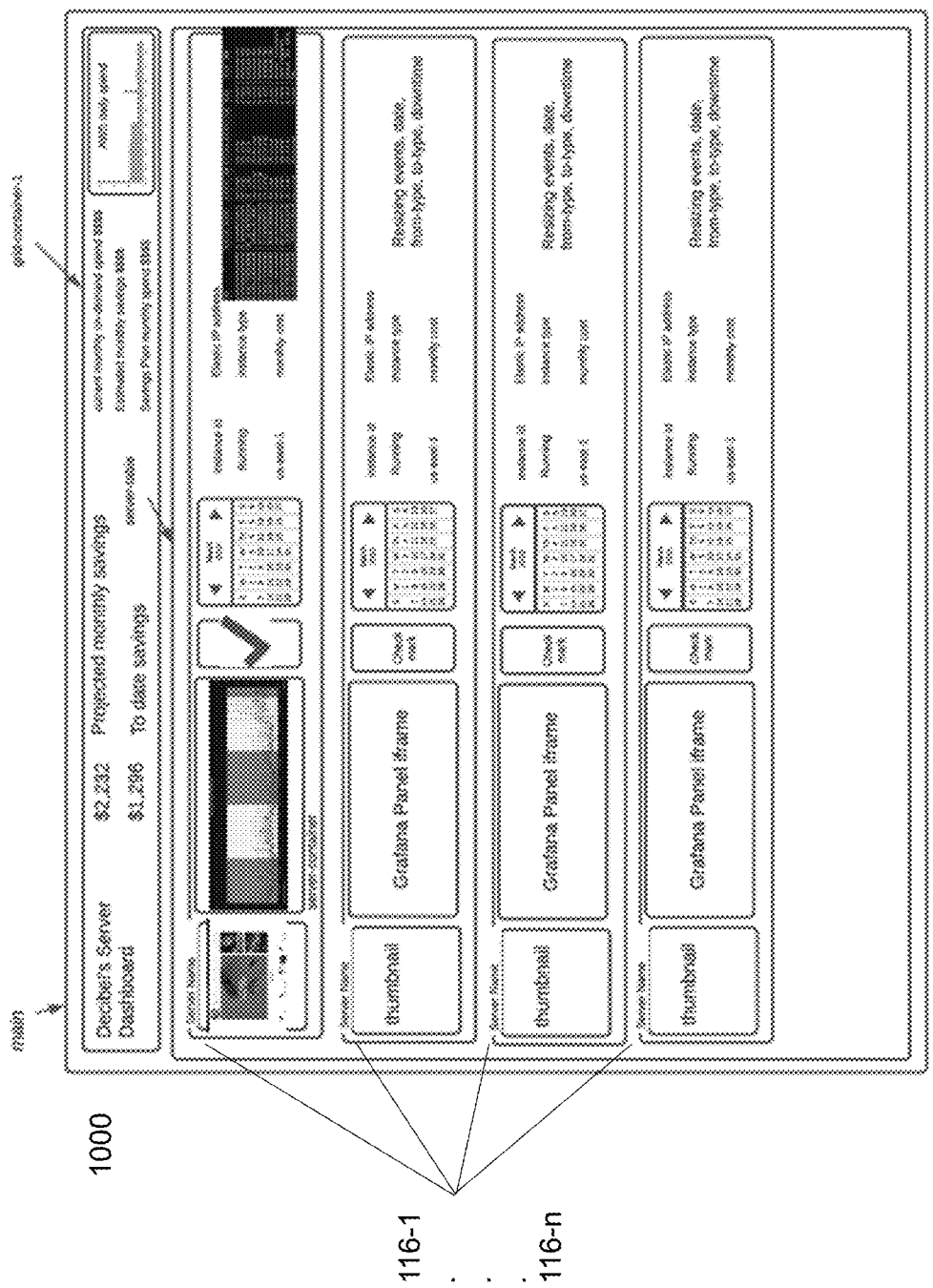

FIG. 10 is a schematic illustration of an exemplary interactive dynamic resizer application interface 1000 for optimizing computer processing power in a cloud computing system in accordance with another embodiment of the present invention. In embodiments, the interactive dynamic resizer application 102 may be stored on non-volatile computer readable memory and operatively connected to an administrator device 104. In embodiments, the interactive dynamic resizer application 102 may be stored on non-volatile computer readable memory and operatively connected to a cloud computing system 108. In embodiments, the interface 1000 may be accessible by a user device 106 associated with a user or administrator. In embodiments, the interface 1000 may include a list of available server instance types 118-n with corresponding computing capacity, memory capabilities, and cost of operation. In embodiments, the interface 1000 may include operations for adding policy rules and/or g policy rule information. In embodiments, as noted above, policy rule information may include a prior usage time threshold associated with a length of time during which a respective server instance 118-n of a first set of server instances 118 has been running; a virtual computing power capacity percentage threshold associated with a percentage of computing power capacity of the respective server instance; and resizing event type information indicating a selection of a second server instance 118-2 based at least on the prior usage of time threshold and the virtual computing power capacity percentage threshold. In embodiments, as noted above, the resizing event type information may include a direction indication associated with each respective virtual computing power capacity percentage threshold indicating whether it is a maximum threshold, "over" which the second server instance is selected to have a larger virtual computing power capacity or whether it is a minimum threshold, "under" which the second server instance is selected to have a smaller virtual computing power capacity. In embodiments, the policy rule information may further include a minimum timeframe between resizing events of the respective server. In embodiments, the policy information may include a scheduled time for initiating resizing events. In embodiments, for example, a policy rule included in the policy rule information may state: "When the server is over 50% CPU utilization in the past 5 minutes, upgrade two types higher with a minimum of 30 minutes between rightsizings", where the prior usage time threshold is "5 minutes"; the virtual computing power capacity percentage threshold is "over 50%"; the resizing event type information is "upgrade two types higher"; and the minimum timeframe between resizing events is "30 minutes". In embodiments, in a scheduling example, a "c5d.large" server instance may be fixed from 12:00 AM to 6:00 AM on Monday, but may be dynamically adjusted from 12:00 AM to 6:00 AM on Tuesday.

FIGS. 11-14 are schematic illustrations of an exemplary interactive dynamic resizer application interface 1000 for optimizing computer processing power in a cloud computing system in accordance with embodiments of the present invention. In embodiments, the interface may display the status of a plurality of servers 116-n. In embodiments, the interface may include for each server 116-n a list of available server instance types 118-n, the cost of operation for each server instance type 118-n and/or usage time statistics. In embodiments, the interface may include for each server 116-n server instance identification information, server instance location, resizing event statistics, CPU utilization statistics, and/or projected cost savings by the use of the interactive dynamic resizer application 102.

Figure 15:
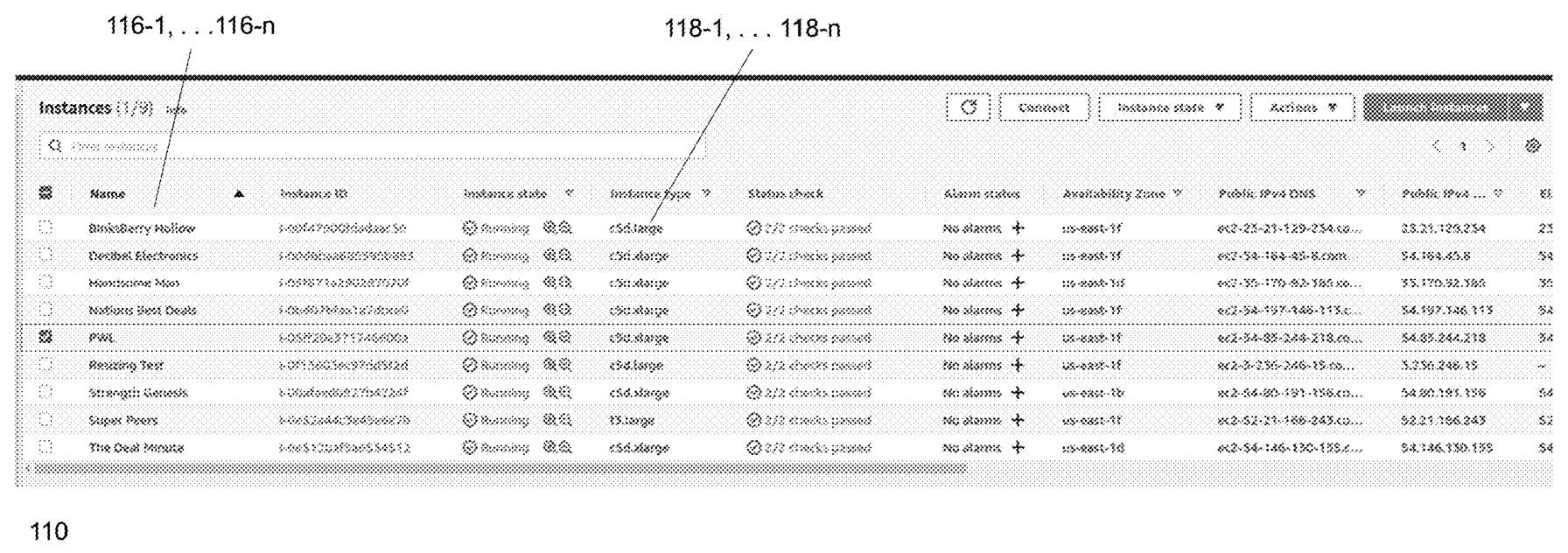

FIG. 15 is a schematic illustration of a typical server management interface 110. In embodiments, the server management interface 110 may be operatively connected to an interactive dynamic resizer application 102 via the Internet. In embodiments, the server management interface 110 may be operatively connected to a cloud network 108 and a server system 112. In embodiments, the server management interface 110 may display a plurality of servers 116-n, server instance identification information, the status of the plurality of servers 116-n, and/or the currently running server instance 118-n. In embodiments, the server management interface 110 may provide options for manually performing server resizing events. The Amazon EC2 server management interface, for example, may display to a customer a list of servers in operation, the Instance ID for each server, the Instance state for each server, and the Instance type for each server. The Amazon EC2 server management interface may allow a user to manually launch, stop, and restart a desired server instance.

Figure 16:
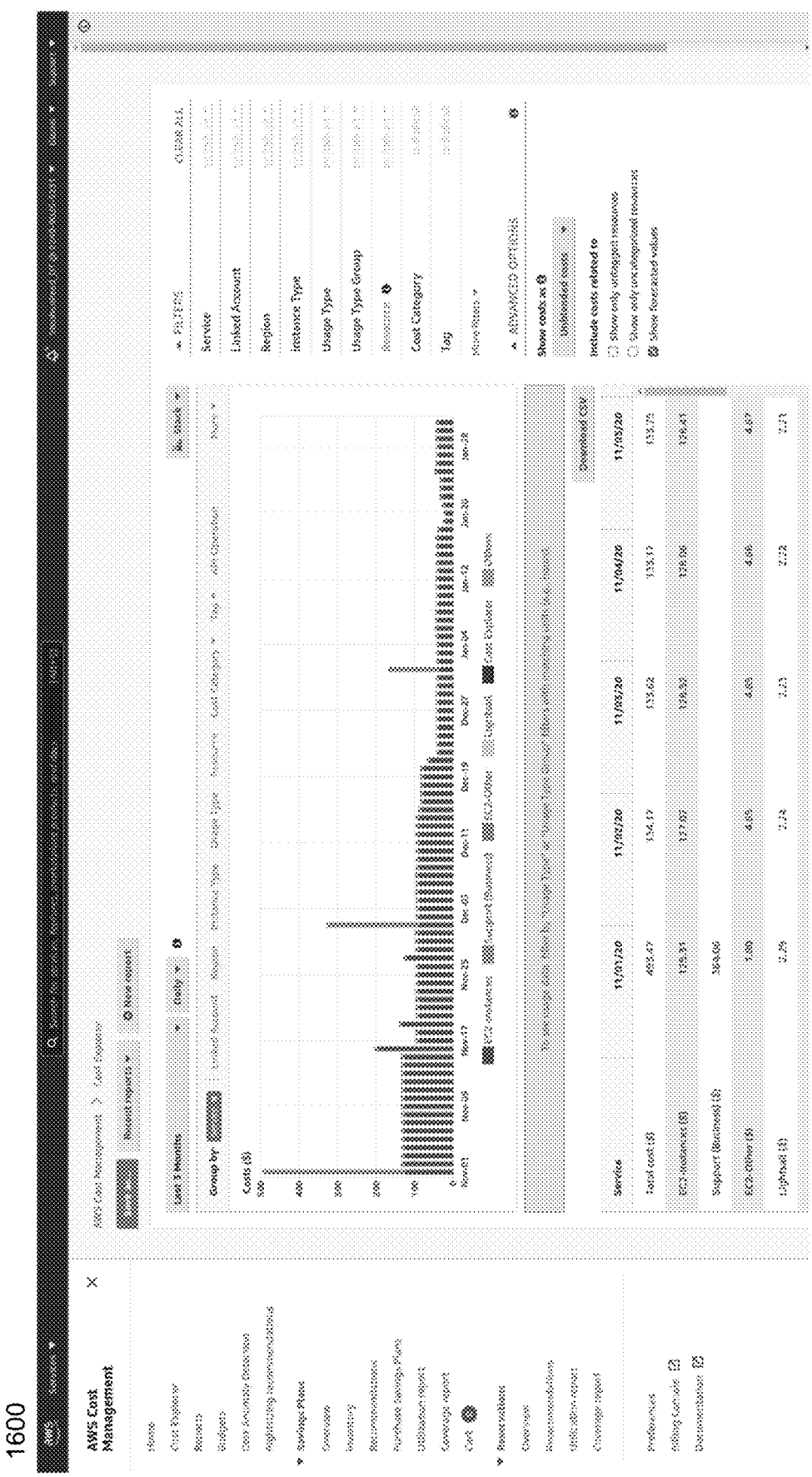
FIGS. 16-17 are schematic illustrations of typical cost management interfaces.
Figure 17:
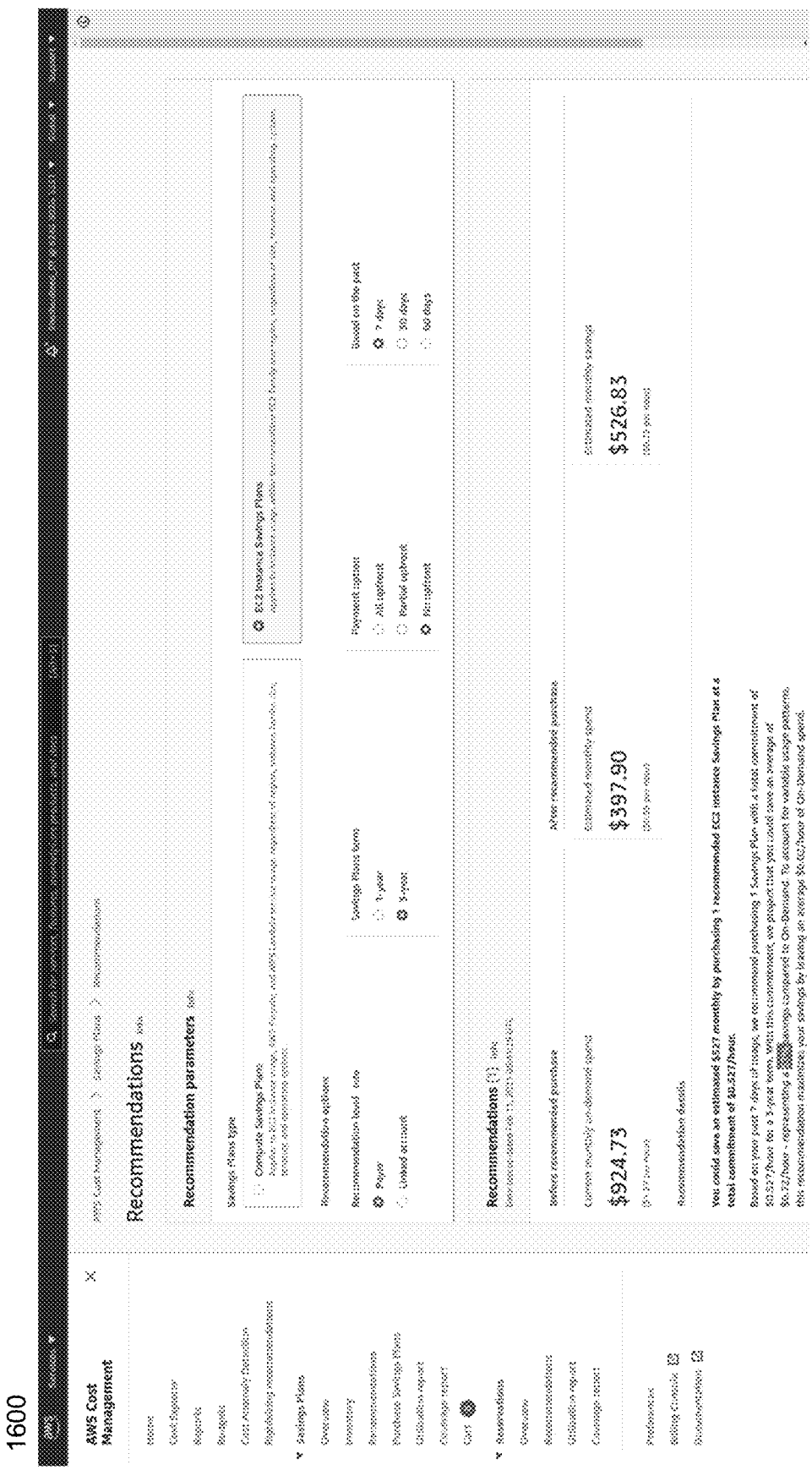

FIGS. 16-17 are schematic illustrations of typical cost management interfaces 1600. In embodiments, a cost management interface 1600 may display information including prior server operation costs over a designated time period. In embodiments, the cost management interface 1600 may include a plurality of server instance purchase plans. Referring to FIG. 16, the Amazon Web Services cost management interface, for example, may display server operating costs over a designated time period. Referring to FIG. 17, the Amazon Web Services cost management interface may also provide recommendations to customers for offers of EC2 services over a designated period of time.

Figure 18:
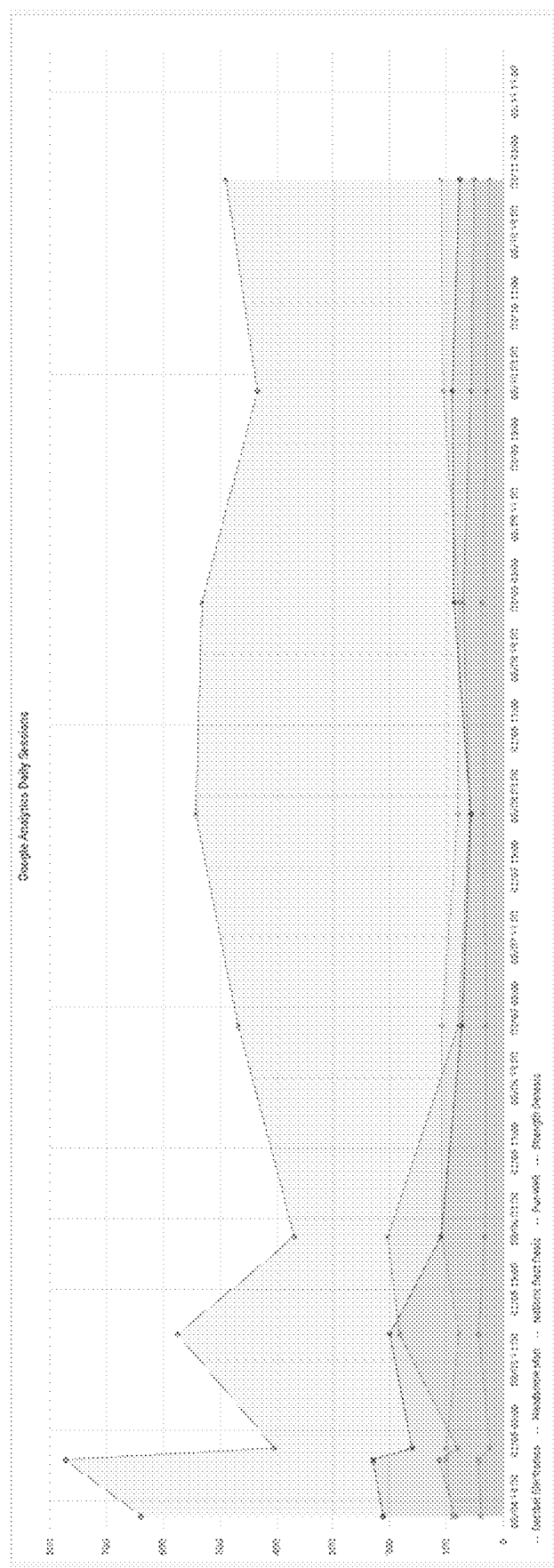
FIG. 18 illustrates an exemplary set of virtual computing capacity usage percentage analytics in accordance with an embodiment of the present invention.

FIG. 18 illustrates an exemplary set of virtual computing capacity usage percentage analytics. Referring to FIG. 18, Google Analytics may provide customers with analytics illustrating virtual computing power usage for each server 116 over a designated period of time.

Figure 19:
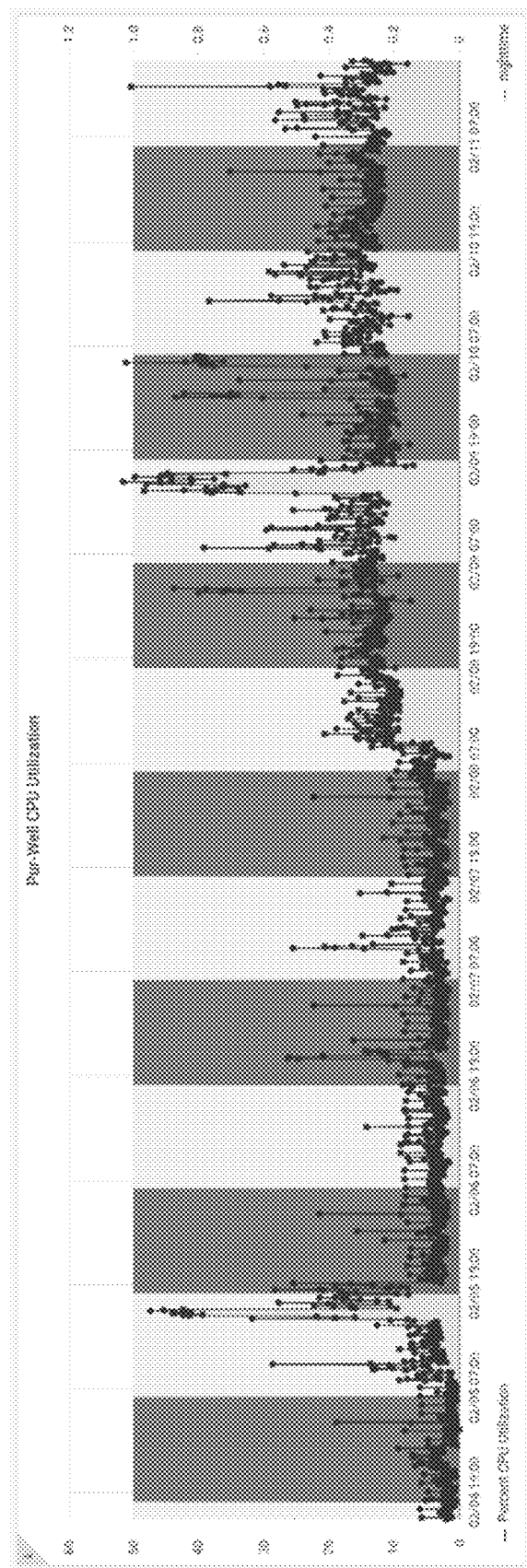
FIGS. 19-20 illustrate virtual computing capacity usage percentage analytics tracked by an interactive dynamic resizer application in accordance with an embodiment of the present invention.
Figure 20:
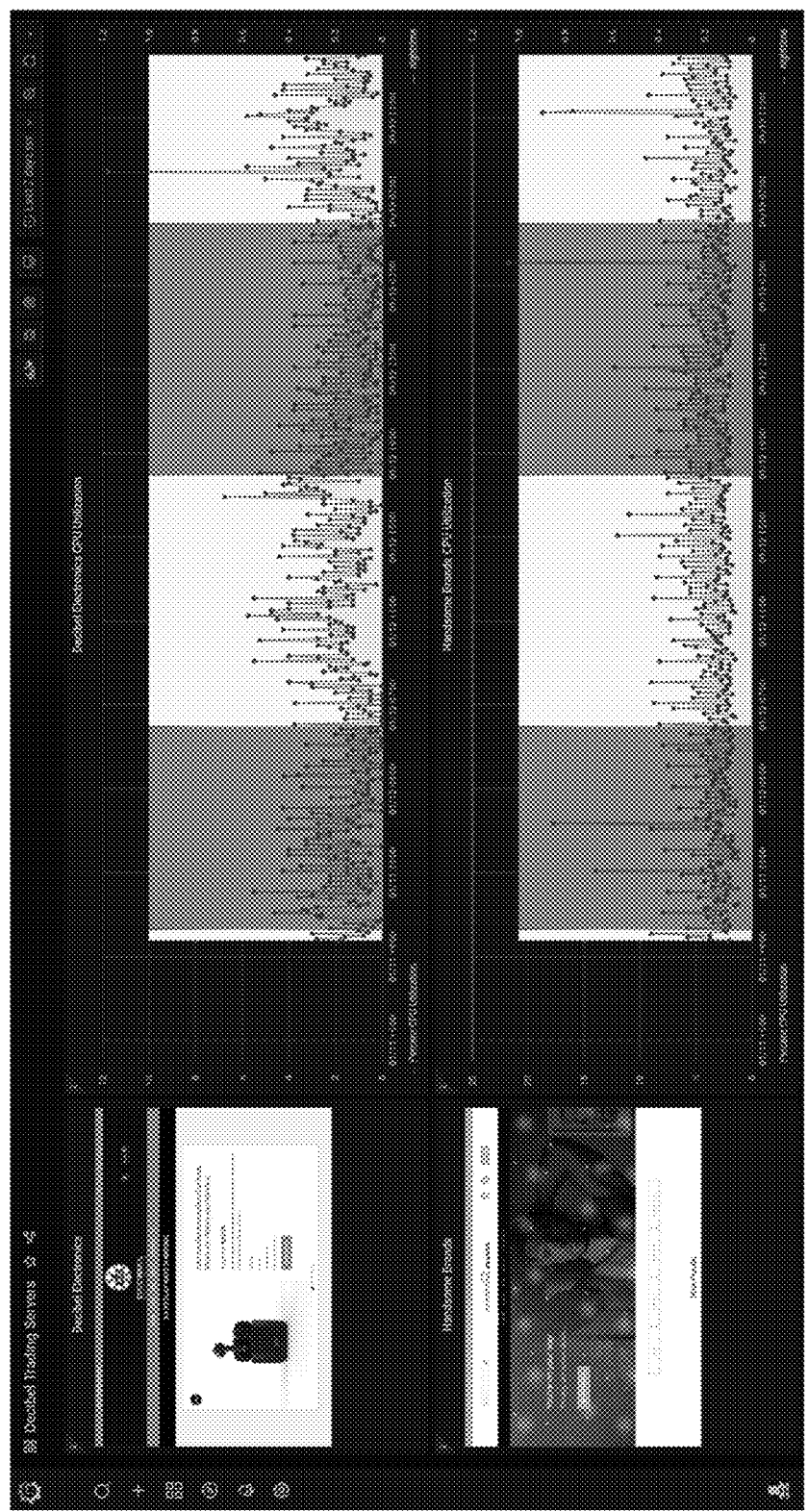

FIGS. 19-20 illustrate virtual computing capacity usage percentage analytics tracked by an interactive dynamic resizer application 102. In embodiments, the interactive dynamic resizer application 102 may track virtual computing power capacity usage percentage for a plurality of servers 116-n over a designated period of time in designated time increments. In embodiments, interactive dynamic resizer application 102 may display the virtual computing capacity usage percentage analytics to the user.

What is claimed is:

1. A method of automatically selecting a server instance on a cloud network from a first set of server instances associated with a first server, wherein the first set of server instances comprises at least a first server instance and a second server instance, comprising:
 a) obtaining, by an interactive dynamic resizer application stored on non-volatile computer readable memory operatively connected to an administrator device, status information of the first server instance currently active, wherein the status information comprises current virtual computing power capacity usage percentage and current usage time information;
 b) accessing, by the interactive dynamic resizer application, policy rule information for the first set of server instances associated with the first server, wherein policy rule information comprises:
  i. a prior usage time threshold associated with a length of time during which a respective server instance of the first set of server instances has been active;
  ii. a virtual computing power capacity percentage threshold associated with a percentage of computing power capacity of the respective server instance; and
  iii. resizing event type information indicating a selection of a second server instance based at least on the prior usage of time threshold and the virtual computing power capacity percentage threshold;

c) identifying, by the interactive dynamic resizer application, the second server instance based on the status information and the policy rules information;
d) automatically selecting, by the interactive dynamic resizer application, the second server instance;
e) generating, by the interactive dynamic resizer application, resizing instructions based on the selected second server instance, wherein the resizing instructions comprise instructions to stop the first server instance and instructions to start the second server instance; and
f) sending, by the interactive dynamic resizer application, the resizing instructions to the cloud network,
wherein when the current usage time exceeds the prior usage time threshold and the current virtual computing power capacity percentage is lower than the threshold virtual computing power capacity percentage, the interactive dynamic resizer application does not trigger a selection of the second server instance such that there is no change in server instance size.

2. The method of claim 1, wherein current time usage information is associated with a length of time during which the first server instance has been active.

3. The method of claim 1, wherein the method further comprises providing a policy rules engine wherein the policy rule information for each server is provided to the policy rules engine and is accessed via the policy rules engine.

4. The method of claim 1, wherein the policy rule information comprises a minimum timeframe between resizing events of the respective server.

5. The method of claim 1, wherein the policy rule information includes a scheduled time for obtaining status information and accessing policy rule information.

6. The method of claim 1, wherein when the current usage time exceeds the prior usage time threshold and the current virtual computing power capacity percentage exceeds the threshold virtual computing power capacity percentage, the interactive dynamic resizer application triggers a selection of the second server instance wherein the second server instance has a larger virtual computing power capacity than the first server instance.

7. The method of claim 6, wherein when the current usage time exceeds the prior usage time threshold and the current virtual computing power capacity percentage exceeds the threshold virtual computing power capacity percentage, the interactive dynamic resizer application triggers a selection of the second server instance wherein there is no other server instance in the first set of server instances that has a larger virtual computing power capacity than the first server instance and a smaller virtual computing power capacity than the second server instance.

8. The method of claim 6, wherein when the current usage time exceeds the prior usage time threshold and the current virtual computing power capacity percentage exceeds the threshold virtual computing power capacity percentage, the interactive dynamic resizer application triggers a selection of the second server instance wherein there is a third server instance in the first set of server instances which has a larger virtual computing power capacity than the first server instance but a smaller virtual computing power capacity than the second server instance.

9. The method of claim 1, wherein when the current usage time exceeds the prior usage time threshold and the current virtual computing power capacity percentage is lower by more than a predetermined amount than the threshold virtual computing power capacity percentage, the interactive dynamic resizer application triggers a selection of the second server instance wherein the second server instance has a smaller virtual computing power capacity than the first server instance.

10. The method of claim 9, wherein when the current usage time exceeds the prior usage time threshold and the current virtual computing power capacity percentage is lower by more than a predetermined amount than the threshold virtual computing power capacity percentage, the interactive dynamic resizer application triggers a selection of the second server instance wherein there is a third server instance in the first set of server instances which has a smaller virtual computing power capacity than the first server instance but a larger virtual computing power capacity than the second server instance.

11. The method of claim 10, wherein when the current usage time exceeds the prior usage time threshold and the current virtual computing power capacity percentage is lower by more than a predetermined amount than the threshold virtual computing power capacity percentage, the interactive dynamic resizer application triggers a selection of the second server instance wherein there is a fourth server instance in the first set of server instances which has a smaller virtual computing power capacity than the third server instance but a larger virtual computing power capacity than the second server instance.

12. The method of claim 11, wherein when the current usage time exceeds the prior usage time threshold and the current virtual computing power capacity percentage is lower by more than a predetermined amount than the threshold virtual computing power capacity percentage, the interactive dynamic resizer application triggers a selection of the second server instance wherein there is a fifth server instance in the first set of server instances which has a smaller virtual computing power capacity than the fourth server instance but a larger virtual computing power capacity than the second server instance.

13. The method of claim 1, wherein when the current usage time exceeds the prior usage time threshold and the a current virtual computing power capacity percentage is lower by more than a predetermined amount than the threshold virtual computing power capacity percentage, the interactive dynamic resizer application triggers a selection of the second server instance wherein there is no other server instance in the first set of server instances that has a smaller virtual computing power capacity than the first server instance and a larger virtual computing power capacity than the second server instance.

14. The method of claim 1, wherein the method further comprises sending, by the interactive dynamic resizer application, instructions to the cloud network via an application program interface.

15. The method of claim 1, further comprising providing, by the interactive dynamic resizer application, server instance information associated with each server instance associated with the first set of server instances, wherein the server instance information for each server instance comprises at least:
   i. a maximum virtual computing power capacity;
   ii. a volume of memory; and
   iii. an amount of network bandwidth.

16. The method of claim 1, further comprising verifying, by the interactive dynamic resizer application, that the second server instance is running properly.

17. The method of claim 1, further comprising reporting, by the interactive dynamic resizer application, a result of the resizing event to a user of the interactive dynamic resizer application.

18. A method of automatically selecting a server instance on a cloud network from a first set of server instances associated with a first server, wherein the first set of server instances comprises at least a first server instance and a second server instance, comprising:
   a) obtaining, by an interactive dynamic resizer application stored on non-volatile computer readable memory operatively connected to an administrator device, status information of the first server instance currently active, wherein the status information comprises current virtual computing power capacity usage percentage and current usage time information;
   b) accessing, by the interactive dynamic resizer application, policy rule information for the first set of server instances associated with the first server, wherein policy rule information comprises:
      i. a prior usage time threshold associated with a length of time during which a respective server instance of the first set of server instances has been active;
      ii. a virtual computing power capacity percentage threshold associated with a percentage of computing power capacity of the respective server instance; and
      iii. resizing event type information indicating a selection of a second server instance based at least on the prior usage of time threshold and the virtual computing power capacity percentage threshold;
   c) identifying, by the interactive dynamic resizer application, the second server instance based on the status information and the policy rules information;
   d) automatically selecting, by the interactive dynamic resizer application, the second server instance;
   e) generating, by the interactive dynamic resizer application, resizing instructions based on the selected second server instance, wherein the resizing instructions comprise instructions to stop the first server instance and instructions to start the second server instance; and
   f) sending, by the interactive dynamic resizer application, the resizing instructions to the cloud network,
wherein when the current usage time does not exceed the prior usage time threshold and the current virtual computing power capacity percentage exceeds the threshold virtual computing power capacity percentage, the interactive dynamic resizer application does not trigger a selection of the second server instance such that there is no change in server instance size.

* * * * *